US009424241B2

(12) United States Patent
Hicks et al.

(10) Patent No.: US 9,424,241 B2
(45) Date of Patent: Aug. 23, 2016

(54) ANNOTATION MODE INCLUDING MULTIPLE NOTE TYPES FOR PAGINATED DIGITAL CONTENT

(71) Applicant: Barnes & Noble College Booksellers, LLC, Basking Ridge, NJ (US)

(72) Inventors: Kourtny M. Hicks, Sunnyvale, CA (US); Amir Mesguich Havilio, Palo Alto, CA (US); Gerald B. Cueto, San Jose, CA (US)

(73) Assignee: Barnes & Noble College Booksellers, LLC, Basking Ridge, NJ (US)

( * ) Notice: Subject to any disclaimer, the term of this patent is extended or adjusted under 35 U.S.C. 154(b) by 138 days.

(21) Appl. No.: 14/145,168

(22) Filed: Dec. 31, 2013

(65) Prior Publication Data

US 2015/0186351 A1    Jul. 2, 2015

(51) Int. Cl.
| | |
|---|---|
| *G06F 17/00* | (2006.01) |
| *G06F 17/24* | (2006.01) |
| *G06F 3/0483* | (2013.01) |
| *G06F 3/0486* | (2013.01) |
| *G06F 3/0482* | (2013.01) |
| *G06F 3/0484* | (2013.01) |

(52) U.S. Cl.
CPC ............ *G06F 17/241* (2013.01); *G06F 3/0482* (2013.01); *G06F 3/0483* (2013.01); *G06F 3/0486* (2013.01); *G06F 3/04842* (2013.01)

(58) Field of Classification Search
CPC .................................................. G06F 17/241
See application file for complete search history.

(56) References Cited

U.S. PATENT DOCUMENTS

| | | | |
|---|---|---|---|
| 4,896,543 A | 1/1990 | Gullman | |
| 5,633,471 A | 5/1997 | Fukushima | |
| 5,844,557 A | 12/1998 | Shively, II | |
| 6,230,169 B1 * | 5/2001 | Nagae ................... | G06F 17/241 715/203 |
| 6,259,438 B1 | 7/2001 | Fleck et al. | |

(Continued)

FOREIGN PATENT DOCUMENTS

EP        0722150 A1    7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; printed from the Internet on Jun. 20, 2013, 6 pages.

(Continued)

*Primary Examiner* — Keith Bloomquist
(74) *Attorney, Agent, or Firm* — Finch & Maloney PLLC

(57) ABSTRACT

Features and techniques are disclosed for interacting with paginated digital content, including a multi-purpose tool and an annotation mode. The multi-purpose tool, which may be represented by a graphic (e.g., a movable interactive graphic), can provide access to multiple modes (e.g., copy, define, note, and/or highlight modes) that a user can invoke. The mode invoked determines the functions performed by the tool when interacting with the paginated digital content. The annotation mode, which may be invoked using the multi-purpose tool or independently thereof, can allow a user to create and edit annotations, such as highlights and notes (e.g., sticky notes, margin notes, and/or highlight notes), for paginated digital content. Editing the annotations may include selecting a desired color for the annotation, for example. The annotation mode may also allow a user to intuitively merge and delete annotations previously added to paginated digital content.

20 Claims, 24 Drawing Sheets

(56) References Cited

U.S. PATENT DOCUMENTS

| | | | |
|---|---|---|---|
| 6,334,157 | B1 | 12/2001 | Oppermann et al. |
| 6,956,564 | B1 | 10/2005 | Williams |
| 7,649,524 | B2 | 1/2010 | Haim et al. |
| 7,840,912 | B2 | 11/2010 | Elias et al. |
| 7,898,541 | B2 | 3/2011 | Hong et al. |
| RE42,738 | E | 9/2011 | Williams |
| 8,059,101 | B2 | 11/2011 | Westerman et al. |
| 8,239,413 | B2 | 8/2012 | Hubert |
| 8,274,536 | B2 | 9/2012 | Chaudhri et al. |
| 8,286,104 | B1 | 10/2012 | Yonge-Mallo |
| D670,713 | S | 11/2012 | Cranfill et al. |
| RE44,103 | E | 3/2013 | Williams |
| 8,400,417 | B2 | 3/2013 | Ording et al. |
| 8,508,494 | B2 | 8/2013 | Moore |
| 2001/0025289 | A1 | 9/2001 | Jenkins et al. |
| 2002/0116421 | A1 | 8/2002 | Fox et al. |
| 2005/0091578 | A1* | 4/2005 | Madan ............ G06F 17/241 715/201 |
| 2005/0193330 | A1* | 9/2005 | Peters ............. G06F 17/211 715/230 |
| 2005/0198202 | A1* | 9/2005 | Yamamoto ...... G06F 17/2247 709/218 |
| 2007/0047002 | A1 | 3/2007 | Hull et al. |
| 2008/0036747 | A1 | 2/2008 | Hope |
| 2010/0017700 | A1* | 1/2010 | Odean ............. G06F 17/241 715/230 |
| 2010/0070845 | A1* | 3/2010 | Facemire ........ G06F 17/241 715/230 |
| 2010/0100854 | A1 | 4/2010 | Russell et al. |
| 2010/0192086 | A1 | 7/2010 | Kocienda et al. |
| 2010/0229130 | A1 | 9/2010 | Edge et al. |
| 2010/0259482 | A1 | 10/2010 | Ball |
| 2010/0262659 | A1 | 10/2010 | Christiansen et al. |
| 2010/0318895 | A1 | 12/2010 | Steinberger et al. |
| 2011/0258542 | A1 | 10/2011 | Kenney et al. |
| 2012/0056821 | A1 | 3/2012 | Goh |
| 2012/0127110 | A1 | 5/2012 | Amm et al. |
| 2012/0139879 | A1 | 6/2012 | Kim et al. |
| 2012/0221938 | A1 | 8/2012 | Patterson et al. |
| 2012/0235901 | A1 | 9/2012 | Binder |
| 2012/0242579 | A1 | 9/2012 | Chua |
| 2012/0242584 | A1 | 9/2012 | Tuli |
| 2012/0249768 | A1 | 10/2012 | Binder |
| 2012/0280947 | A1 | 11/2012 | Weaver et al. |
| 2012/0311438 | A1 | 12/2012 | Cranfill et al. |
| 2012/0329529 | A1 | 12/2012 | van der Raadt |
| 2013/0016045 | A1 | 1/2013 | Zhao et al. |
| 2013/0036383 | A1 | 2/2013 | Yuan et al. |
| 2013/0063364 | A1 | 3/2013 | Moore |
| 2013/0076632 | A1 | 3/2013 | Sirpal et al. |
| 2013/0076637 | A1 | 3/2013 | Teltz |
| 2013/0076638 | A1 | 3/2013 | Sirpal et al. |
| 2013/0076781 | A1 | 3/2013 | Sirpal et al. |
| 2013/0113699 | A1 | 5/2013 | Lim |
| 2013/0120271 | A1 | 5/2013 | Lee et al. |
| 2013/0135234 | A1 | 5/2013 | Hisano et al. |
| 2013/0139078 | A1 | 5/2013 | Chuang et al. |
| 2013/0139107 | A1 | 5/2013 | Jung |
| 2013/0162532 | A1 | 6/2013 | Cheng et al. |
| 2013/0185680 | A1 | 7/2013 | Chaudhri et al. |
| 2013/0194308 | A1 | 8/2013 | Privault et al. |
| 2013/0198602 | A1* | 8/2013 | Kokemohr ...... G06F 17/30011 715/233 |

OTHER PUBLICATIONS

Volpe, Joseph, Amazon patents intelligent pen for adding annotations to digital and printed media (updated), http://www.engadget.com/2012/03/06/amazon-patents-intelligent-pen/, posted Mar. 6, 2012 at 5:39 PM, 3 pages.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, published Feb. 28, 2013, 13 pages.

"Bamboo Stylus," Wacom Americas, http://www.wacom.com/en/products/stylus, printed from the Internet on Jun. 20, 2013, 5 pages.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, printed from the Internet on Aug. 2, 2013, 1 page.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9/10/04, 10 pages.

"Pen," DuoSense Pen, N-trig Hands-on computing, http://www.n-trig.com/Content.aspx?Page=DigitalPencil, printed from the Internet on Jun. 20, 2013, 3 pages.

"Easing functions," Easing Functions Cheat Sheet, http://easings.net/, printed from the Internet on Jun. 17, 2013, 3 pages.

Kirupa, Easing Functions (aka Timing Functions) in CSS3, http://www.kirupa.com/html5/easing_functions_css3.htm, published Apr. 3, 2013, 16 pages.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, printed from the Internet on Aug. 2, 2013, 5 pages.

"Simultaneous Pen & Touch: The Natural Way to Work," Perceptive Pixel Active Stylus, www.perceptivepixel.com/_literature_136086/Active_Stylus, printed from the Internet on Dec. 14, 2012, 2 pages.

"Future Apple Notebooks & Tablets may use Acoustic Commands—Patently Apple," http://www.patentlyapple.com/patently-apple/2011/02/future-apple-notebooks-tablets-may-use-acoustic-commands.html, published Feb. 18, 2011, 6 pages.

"Guidelines for selecting text and images (Windows Store apps)," http://msdn.microsoft.com/en-us/library/windows/apps/hh465334, printed from the Internet on Jun. 20, 2013, 5 pages.

Lutz, Zachary, "Hands-on with wireless, ultrasonic stylus an touchless gestures at MWC (video)," http://www.engadget.com/2012/03/01/hands-on-with-wireless-ultrasonic-stylus-and-touchless-gestures/, posted Mar. 1, 2012 at 8:28 AM, 3 pages.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, printed from the Internet on Jun. 20, 2013, 6 pages.

"How do WACOM tablets work?," tablet4u.co.uk, http://www.tablet4u.co.uk/techinfo.html, printed from the Internet on Jun. 20, 2013, 2 pages.

Kim, Arnold, "Multi-Touch Page Flipping eBook Concept Shown on an iPad," http://www.macrumors.com/2012/01/23/multi-touch-page-flipping-ebook-concept-shown-on-an-ipad/, posted Jan. 22, 2012 at 10:52 PM, 6 pages.

"Desktop Touchscreens,"—Desktop touchscreens explained, http://www.touchscreenmagazine.nl/touchscreen-solutions/desktop-touchscreens, printed from the Internet on Nov. 3, 2012, 1 page.

"MTStylus Wireless Stereo Stylus for iPhone/Andriod Phone & Tablet," dexim-MTStylus Wireless Stereo Stylus, http://www.dexim.net/content.php?id=165&pid=11, printed from the Internet on Jun. 20, 2013, 2 pages.

"Padblue 2," BRANDO—mobile.brando.com, http://mobile.brando.com/Padblue-2_p9162c1577d94.html., printed from the Internet on May 10, 2013, 4 pages.

Fingas, Jon, "Panasonic mobile devices to use Anoto's pattern-based pen input technology," http://www.engadget.com/2013/01/08/panasonic-mobile-devices-to-use-anoto-pattern-pen-input/, posted Jan. 8, 2013 at 1:00 PM, 4 pages.

"Bluetooth 4.0 SmartPen the future just got a little brighter," Pogo Connect, http://tenonedesign.com/connect.php, printed from the Internet on Jun. 20, 2013, 7 pages.

Quick, Darren, "Pressure sensitive technology set to bring 3D capability to touchscreens," Mobile Technology, http://www.gizmag.com/new-touchscreen-technology, published on Jan. 31, 2010, 4 pages.

Rigg, Jamie, "Sony tries to patent stylus with friction-based haptic feedback," http://www.engadget.com/2012/11/22/sony-haptic-feedback-stylus-patent/, posted on Nov. 22, 2012 at 9:50 AM, 2 pages.

(56) References Cited

OTHER PUBLICATIONS

"Stylus Hanging Bluetooth Headset," BRANDO—mobile.brando.com, http://mobile.brando.com/prod_detail.php?prod_id=03291, printed from the Internet on May 10, 2013, 4 pages.

"The JukeStyle is a great budget stylus for your iOS devices," stylus Archives—iPad News, http://www.ipadnews.nl/tag/stylus/, printed from the Internet on Jun. 20, 2013, 44 pages.

Lavrinc, Damon, "Why Flipping Through Paper-Like Pages Endures in the Digital World," Gadget Lab, http://www.wired.com/gadgetlab/2012/05/why-flipping-through-paper-like-pages-endures-in-the-digital-world/, posted on May 11, 2012 at 3:48 PM, 5 pages.

Bragdon, et al., "Experimental Analysis of Touch-Screen Gesture Designs in Mobile Environments", CHI 2011—Session: Gestures, May 7-12, 2011, Vancouver, BC, Canada. Copyright 2011 ACM 978-1-4503-0267-8/11/05, pp. 403-412.

"Gesture Search for Google Mobile", Google Mobile, www.google.com/mobile/gesture-search, printed from the Internet on Dec. 26, 2012, 1 page.

"Comics by comiXology," Comic Book Reader Guide, http://www.comicbookreaderguide.com/comics-by-comixology/, printed from the Internet on May 6, 2013, 24 pages.

"NFC Forum: Frequently Asked Questions," http://www.nfc-forum.org/resources/faqs#acknowledge, printed from the Internet on Feb. 18, 2013, 11 pages.

"How to Remote Wipe an iPhone or iPad," OSXDaily, http://osxdaily.com/2012/06/05/remote-wipe-iphone-or-ipad/, published Jun. 5, 2012, 4 pages.

"Screen hotspot," Wikipedia, the free encyclopedia, http://en.wikipedia.org/wiki/Screen_hotspot, printed from the Internet on May 15, 2013, 1 page.

"PAiA-Touch Switches," copyright 2006 PAiA Corporation USA, http://www.paia.com/ProdArticles/touchsw.html, printed from the Internet on Aug. 27, 2013, 3 pages.

Kanai, et al., "Intra-Rendition Navigation," Copyright 2012-2013 International Digital Publishing Forum (IDPF), 13 pages.

"Explaining how the sPen tech works (and is very diff than other styluses)," http://forum.xda-developers.com/showthread.php?t=1439369, posted Jan. 11, 2012, 8:20 AM, 1 page.

"Navigation Drawer," http://developer.android.com/design/patterns/navigation-drawer.html, downloaded from the internet on Dec. 20, 2013, 14 pages.

\* cited by examiner

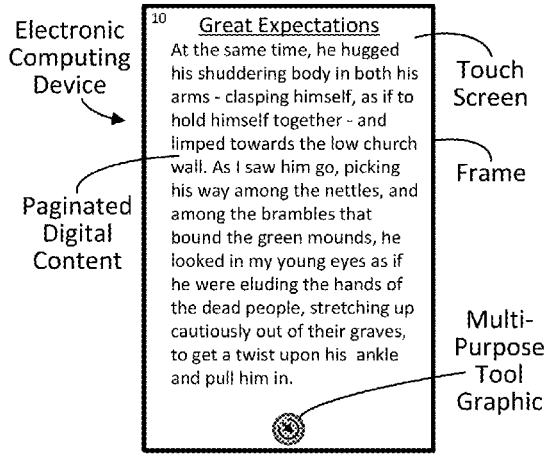
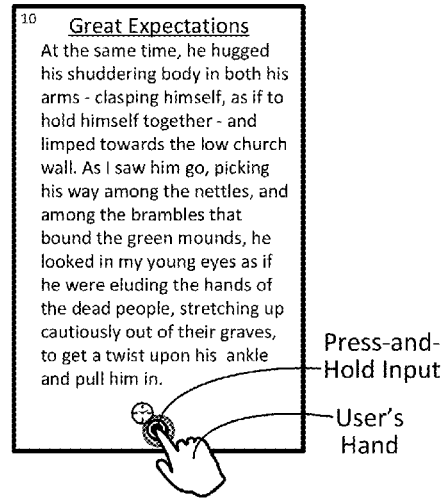
Fig. 3a  Fig. 3b
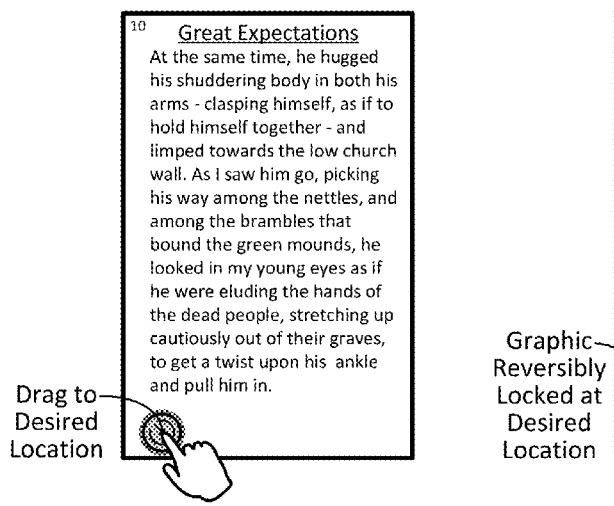
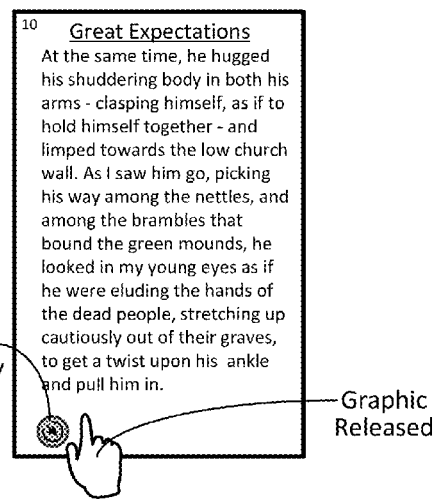
Fig. 3c  Fig. 3d

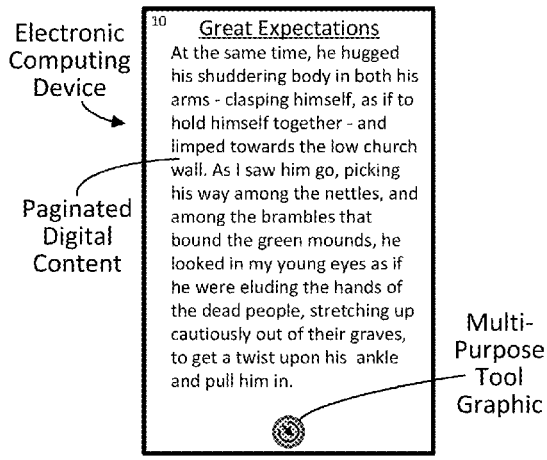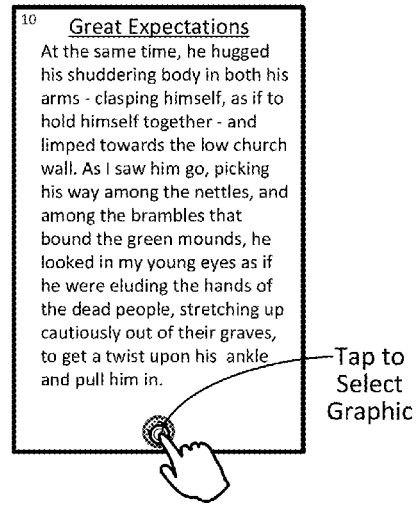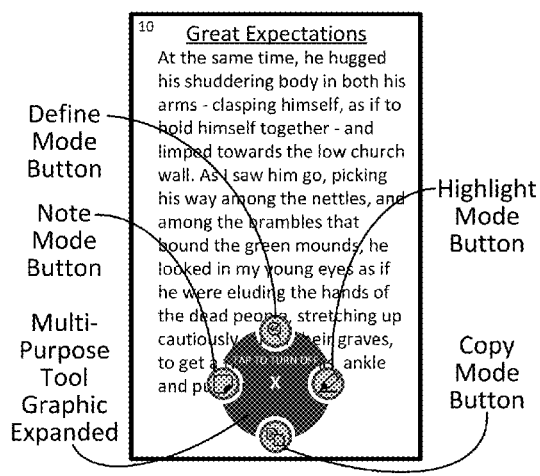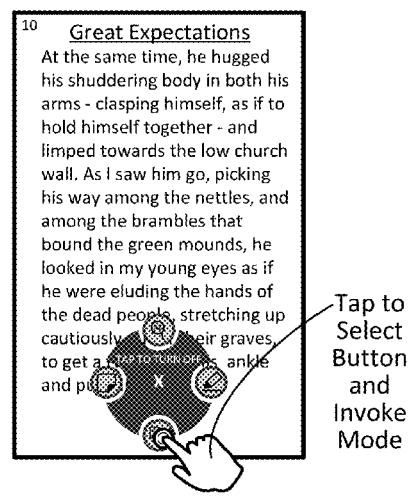
Fig. 3e    Fig. 3f
Fig. 3g    Fig. 3h

Swipe Leftward from Multi-Purpose Tool Graphic to Invoke Note Mode

Swipe Rightward from Multi-Purpose Tool Graphic to Invoke Highlight Mode

Swipe Upward from Multi-Purpose Tool Graphic to Invoke Define Mode

Swipe Downward from Multi-Purpose Tool Graphic to Invoke Copy Mode

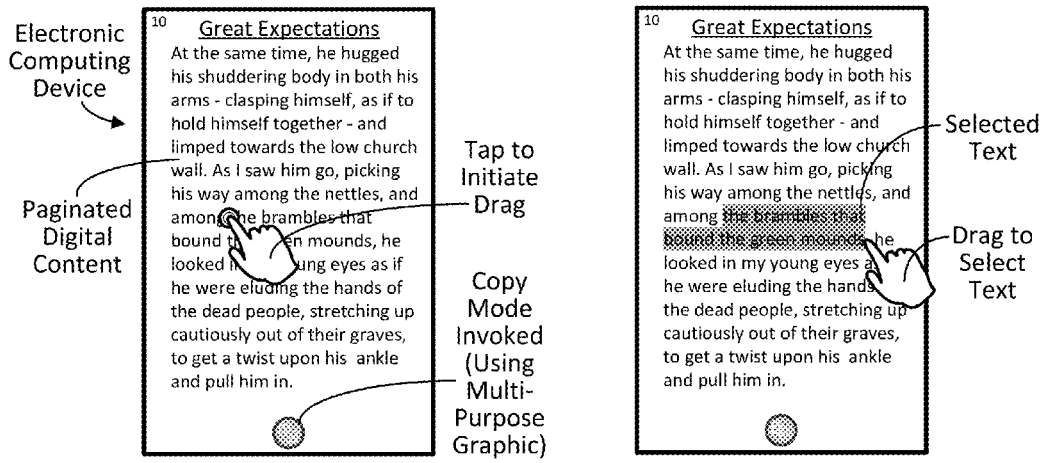
Fig. 4a  Fig. 4b
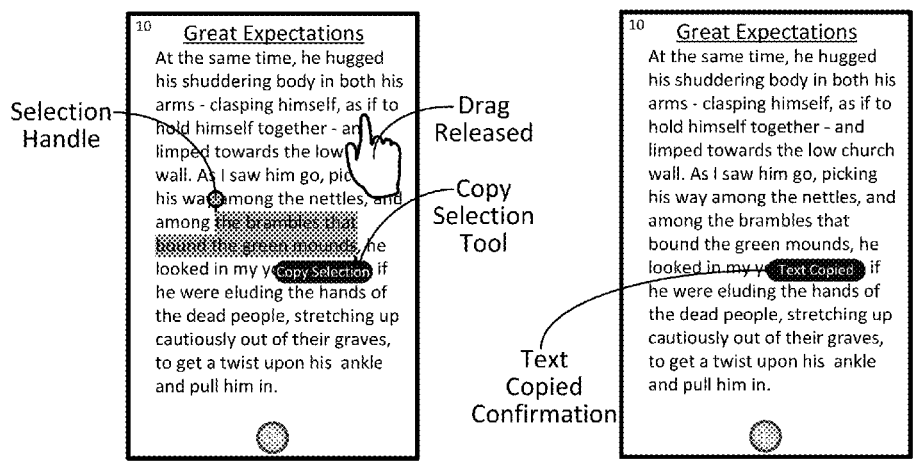
Fig. 4c  Fig. 4d

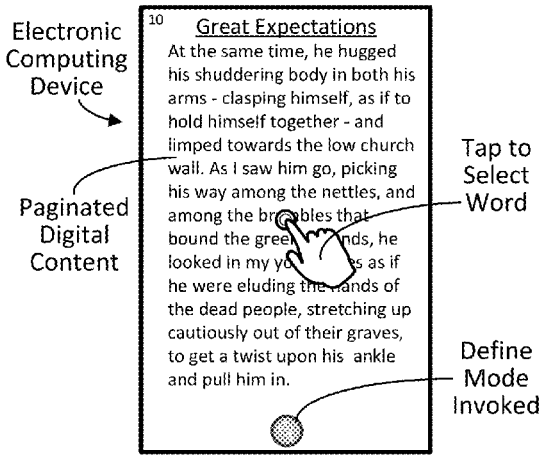
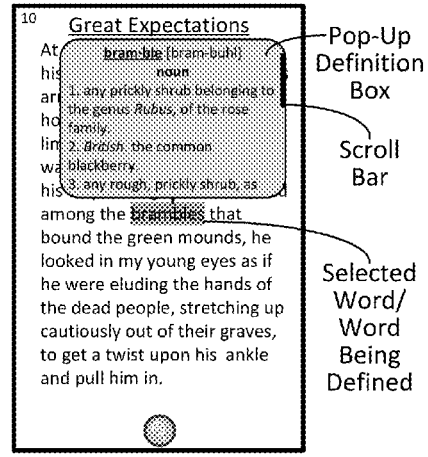
Fig. 5a  Fig. 5b
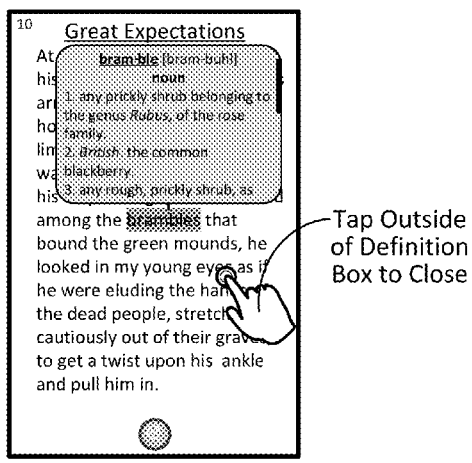
Fig. 5c  Fig. 5d

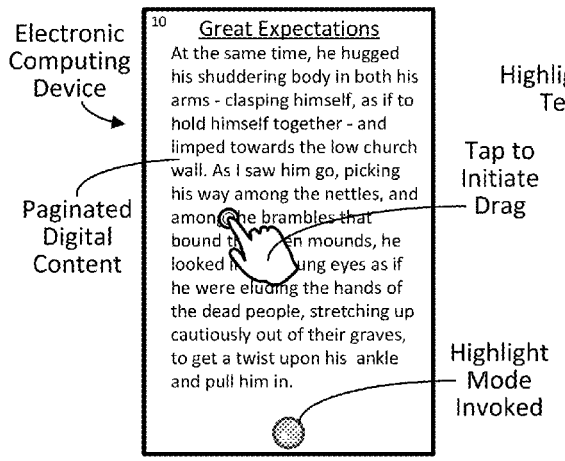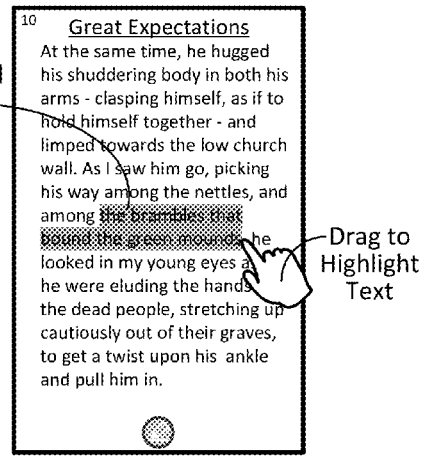
Fig. 6a  Fig. 6b
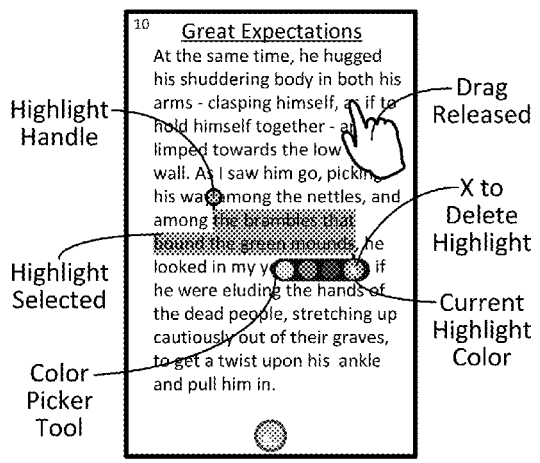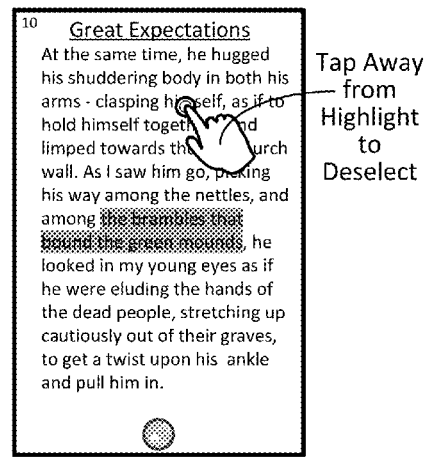
Fig. 6c  Fig. 6d

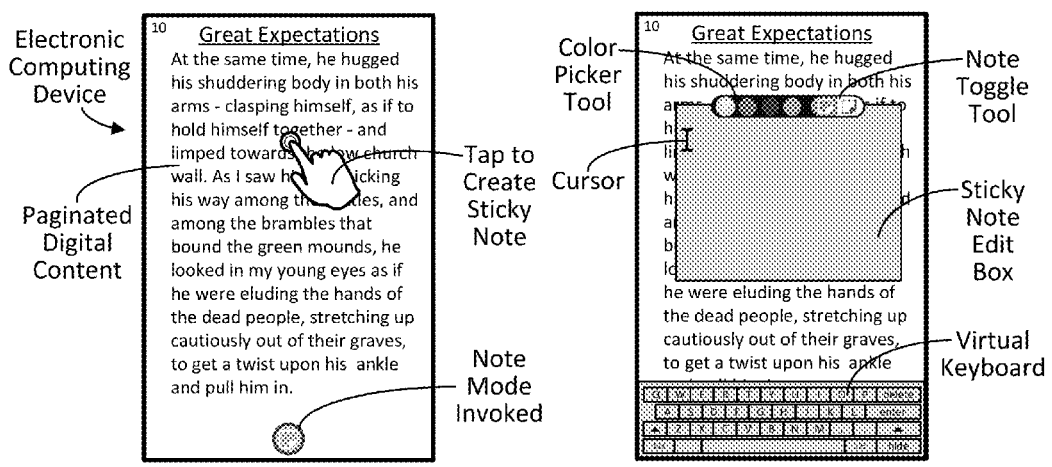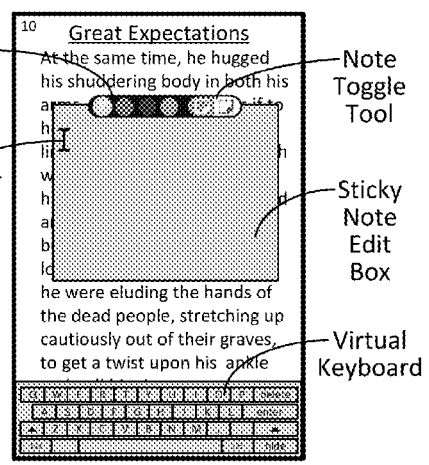
Fig. 7a          Fig. 7b
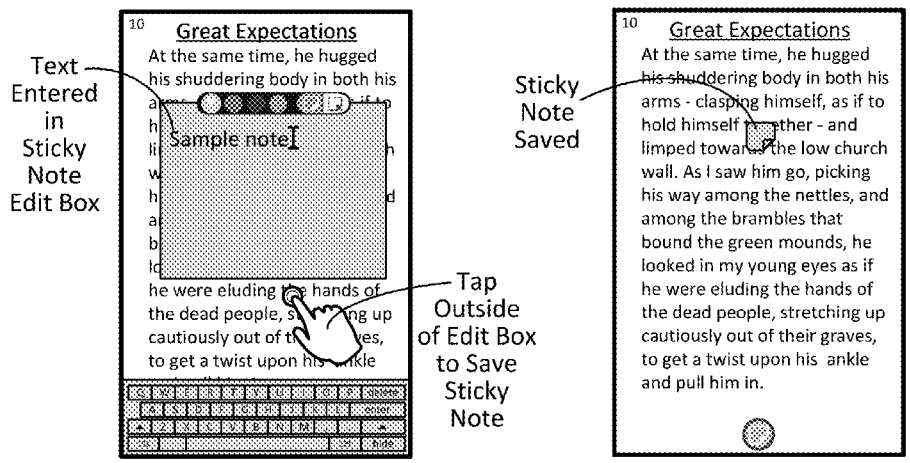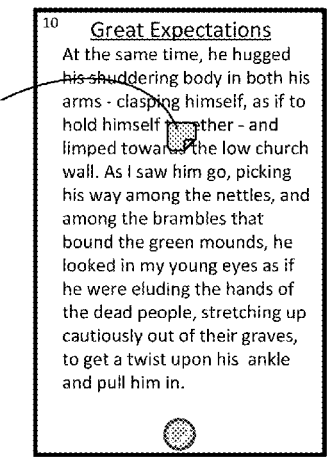
Fig. 7c          Fig. 7d

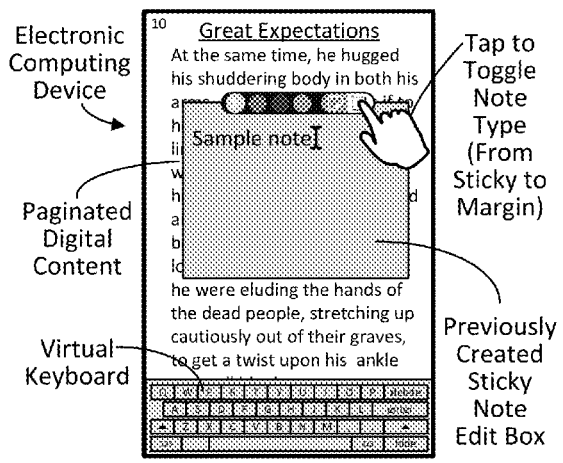
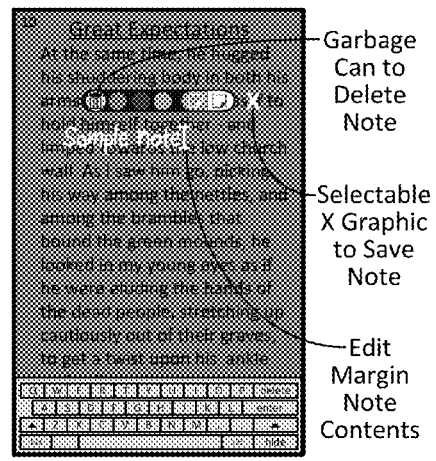
Fig. 8a  Fig. 8b
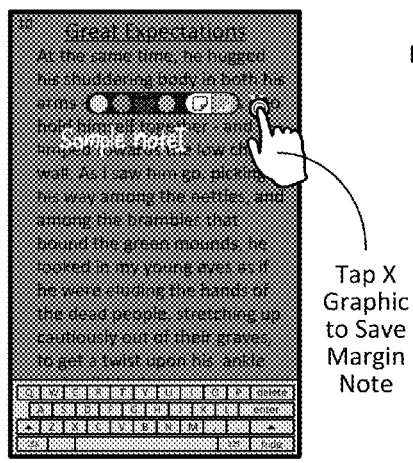
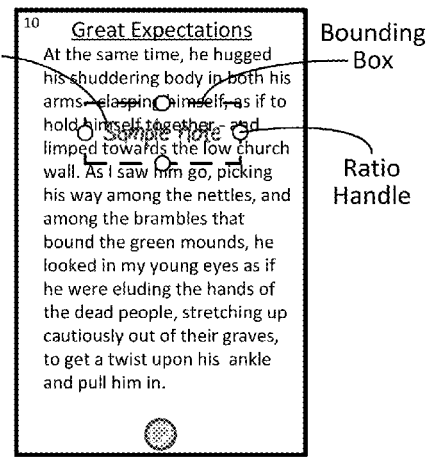
Fig. 8c  Fig. 8d

Bounding Box Rotated Using 2 Finger Gesture

Bounding Box Resized By Dragging Ratio Handles

Bounding Box Moved Using Press-and-Hold Then Drag to Desired Location

Margin Note Saved

Tap Outside of Bounding Box to Save Margin Note

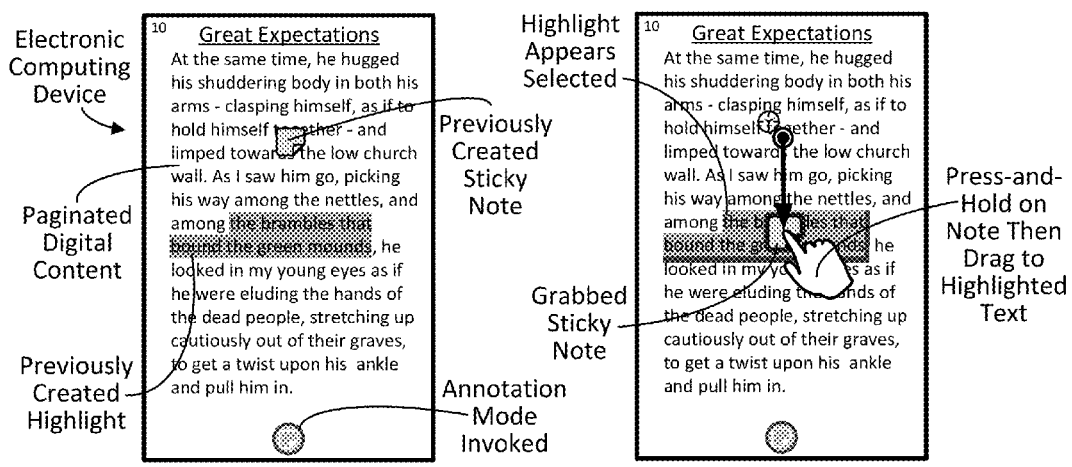
Fig. 9a  Fig. 9b
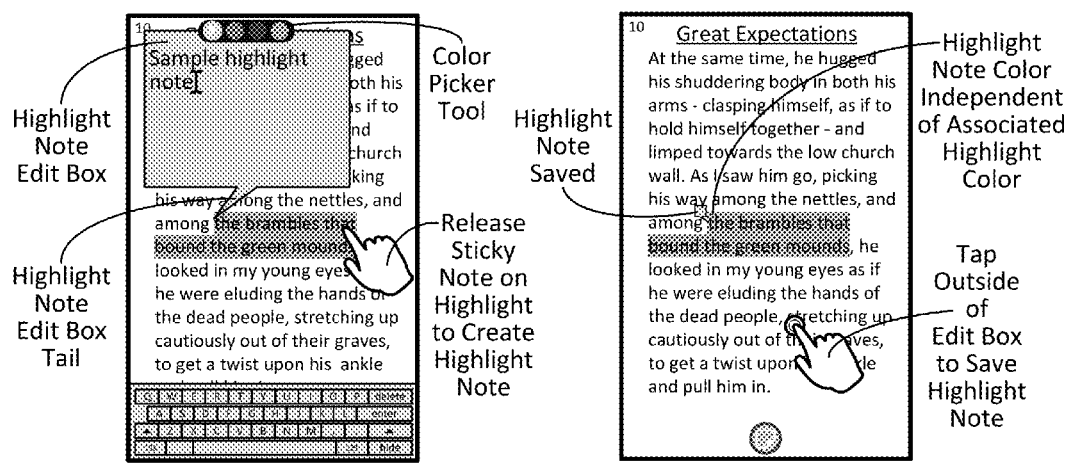
Fig. 9c  Fig. 9d

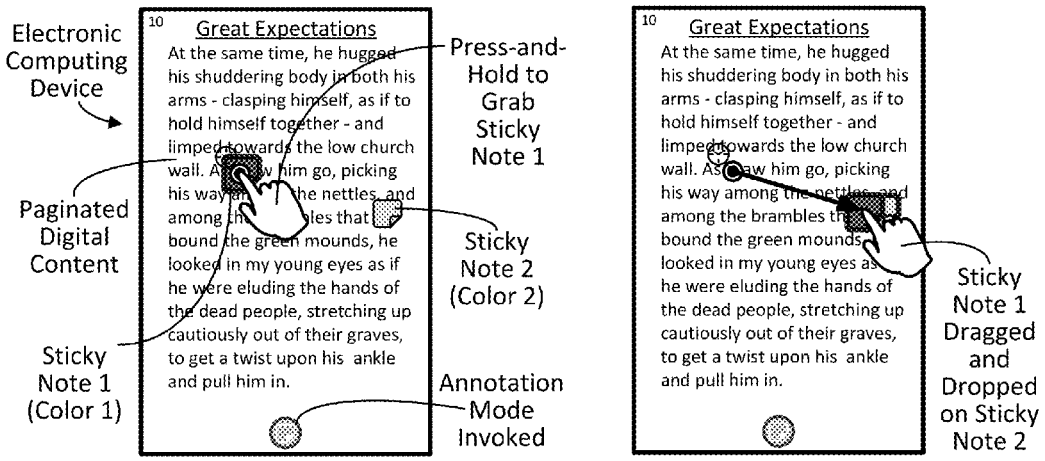
Fig. 10a                    Fig. 10b
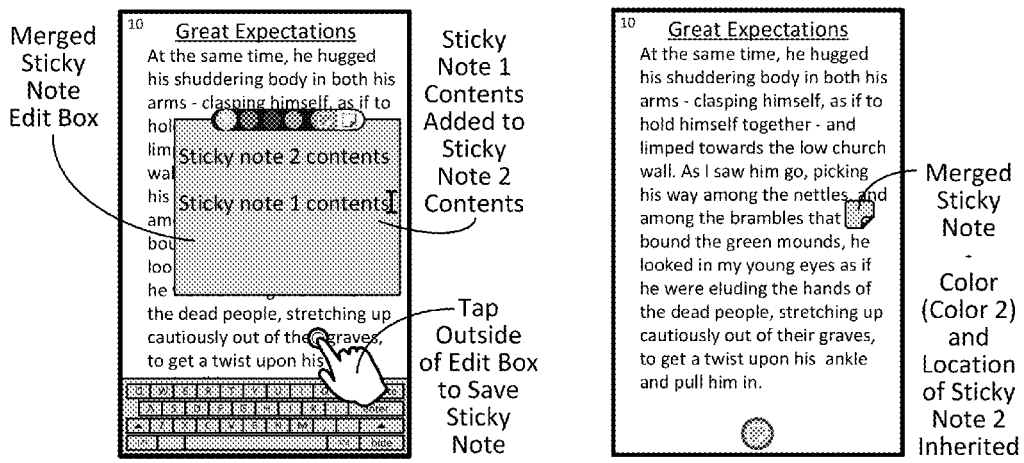
Fig. 10c                    Fig. 10d

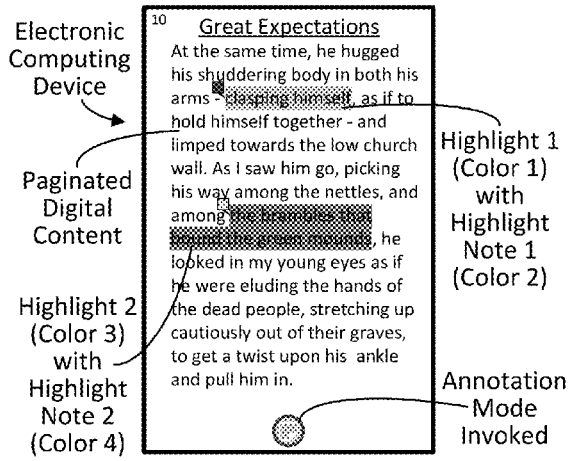 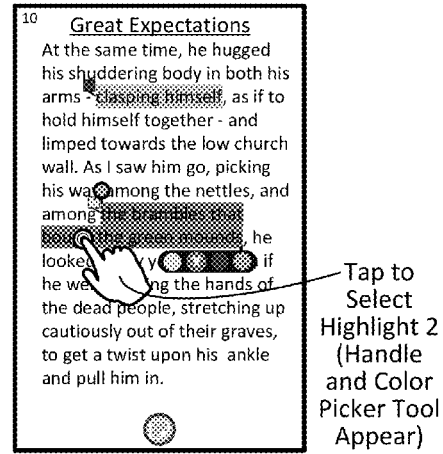
Fig. 11a  Fig. 11b
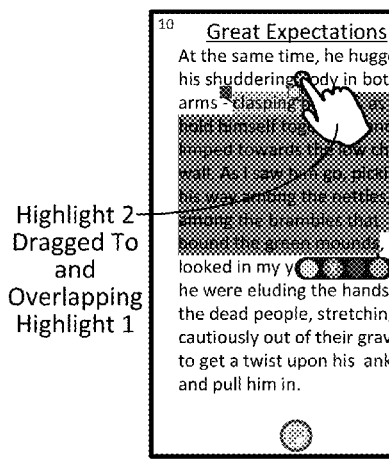 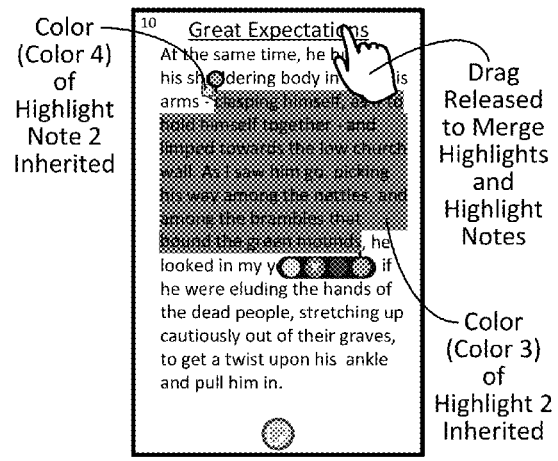
Fig. 11c  Fig. 11d

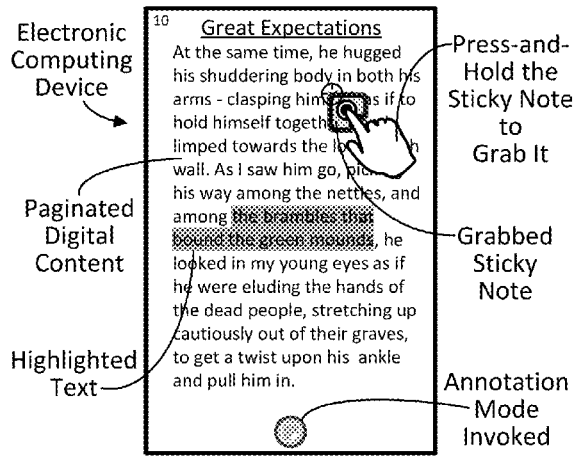
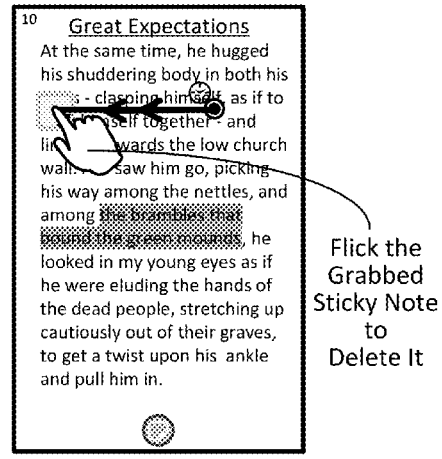
Fig. 12a
Fig. 12b
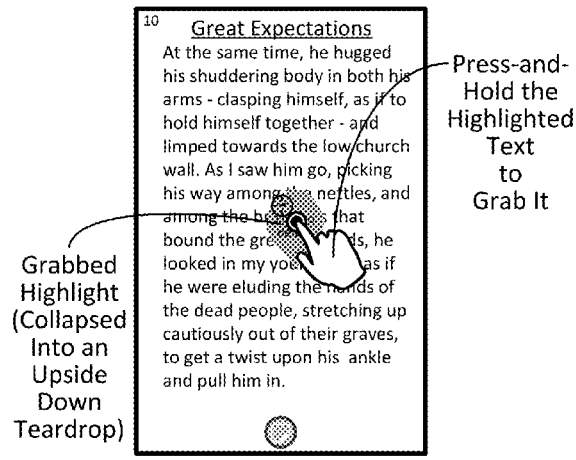
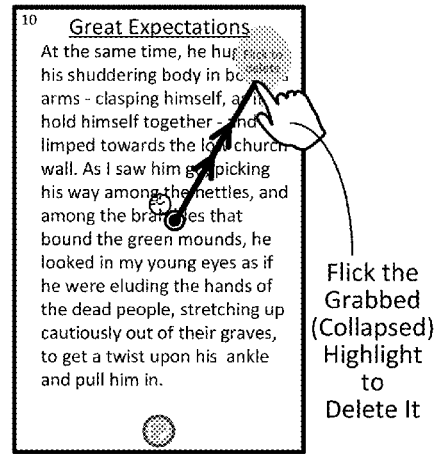
Fig. 12c
Fig. 12d

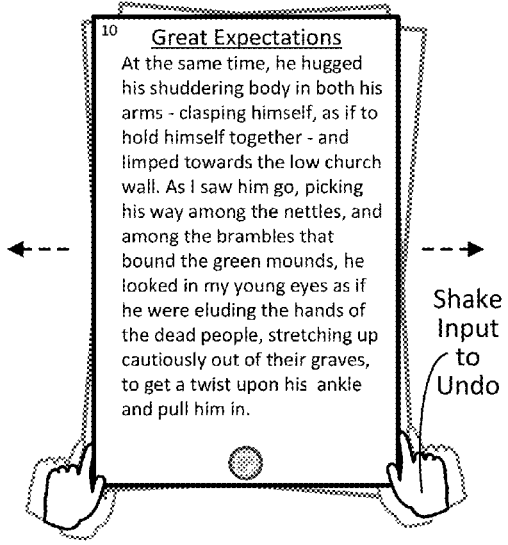
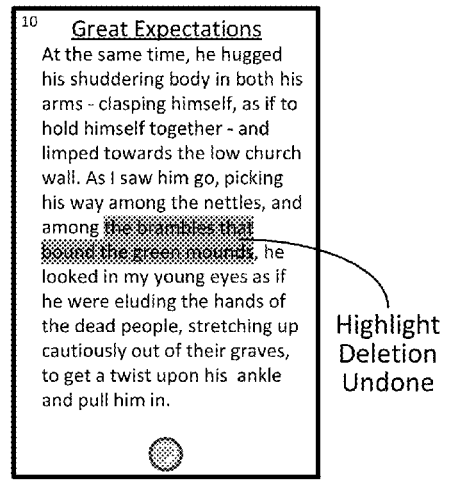
Fig. 12e  Fig. 12f
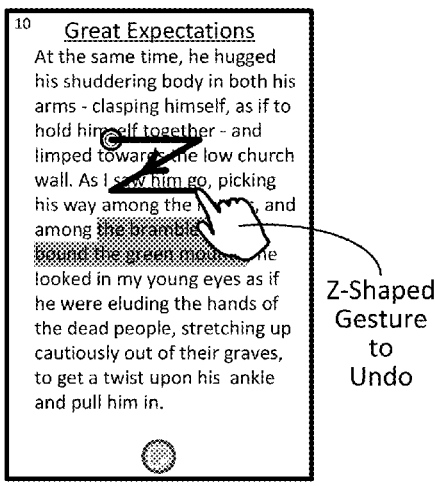
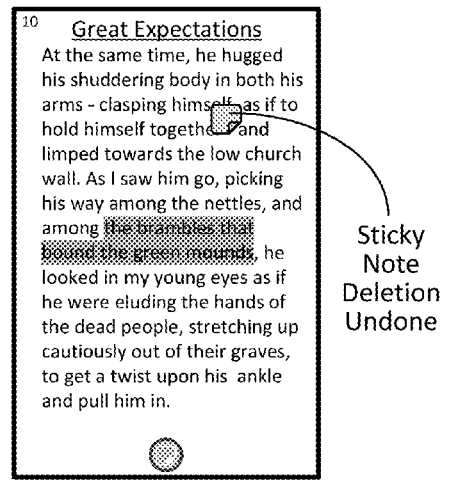
Fig. 12g  Fig. 12h

Fig. 13c

ANNOTATION MODE INCLUDING MULTIPLE NOTE TYPES FOR PAGINATED DIGITAL CONTENT

RELATED APPLICATIONS

This application is related to: U.S. application Ser. No. 14/145,111 filed Dec. 31, 2013 and titled Multi-Purpose Tool for Interacting with Paginated Digital Content; U.S. application Ser. No. 14/145,119 filed Dec. 31, 2013 and titled Merging Annotations of Paginated Digital Content; and U.S. application Ser. No. 14/145,129 filed Dec. 31, 2013 and titled Deleting Annotations of Paginated Digital Content. Each of these applications is herein incorporated by reference in its entirety.

FIELD OF THE DISCLOSURE

This disclosure relates to electronic computing devices, and more particularly, to user interface (UI) techniques for interacting with paginated digital content on such devices.

BACKGROUND

Electronic computing devices such as tablets, eReaders, mobile phones, smart phones, personal digital assistants (PDAs), and other such devices are commonly used for displaying digital content. The content may be, for example, an eBook, a web page, an online article or blog, images, a movie or video, a map, just to name a few types. Such devices may also be useful for displaying a user interface that allows a user to interact with one or more applications running on the device. The applications may allow a user to read or browse through paginated digital content, such as electronic books (eBooks), magazines, catalogs, or comics, for example. The computing devices may also include a touch-sensitive surface/interface for receiving user input such as a touch screen or a track pad (e.g., in combination with a non-touch-sensitive display). The user may interact with such touch-sensitive electronic computing devices using fingers and/or a stylus, for example.

BRIEF DESCRIPTION OF THE DRAWINGS

FIGS. 3a-m collectively illustrate an example multi-purpose tool for an electronic computing device, configured in accordance with one or more embodiments of the present invention.

FIGS. 4a-d illustrate an example copy mode of an electronic computing device, configured in accordance with an embodiment of the present invention FIGS. 5a-d illustrate an example define mode of an electronic computing device, configured in accordance with an embodiment of the present invention.

FIGS. 6a-d illustrate an example highlight mode of an electronic computing device, configured in accordance with an embodiment of the present invention.

FIGS. 7a-d illustrate creating and editing a sticky note using an example note mode of an electronic computing device, in accordance with an embodiment of the present invention.

FIGS. 8a-h illustrate creating and editing a margin note using an example note mode of an electronic computing device, in accordance with an embodiment of the present invention.

FIGS. 9a-d illustrate creating and editing a highlight note using an example note mode of an electronic computing device, in accordance with an embodiment of the present invention.

FIGS. 10a-d illustrate merging sticky notes added to paginated digital content, in accordance with an embodiment of the present invention.

FIGS. 11a-h illustrate merging highlights including highlight notes added to paginated digital content, in accordance with an embodiment of the present invention.

FIGS. 12a-d illustrate deleting annotations added to paginated digital content, in accordance with one or more embodiments of the present invention.

FIGS. 12e-h illustrate undoing the annotation deletions performed in FIGS. 12a-d, in accordance with one or more embodiments of the present invention.

FIGS. 13a-c illustrate example filtering and searching functions for an annotation mode of an electronic computing device, in accordance with one or more embodiments of the present invention.

DETAILED DESCRIPTION

Figure 1A:
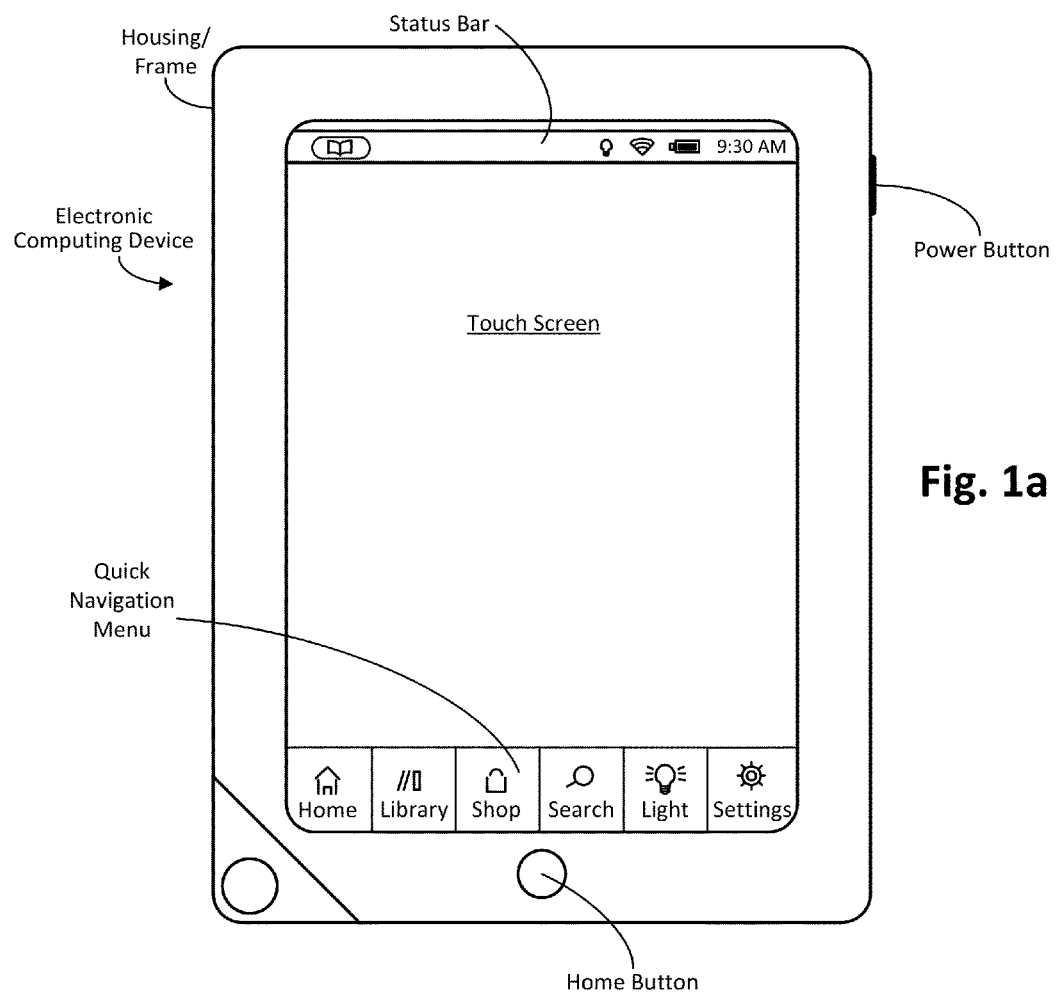
FIG. 1a illustrates an example electronic computing device, configured in accordance with one or more embodiments of the present invention.

Features and techniques are disclosed for interacting with paginated digital content, including a multi-purpose tool and an annotation mode. The multi-purpose tool, which may be represented by a graphic (e.g., a movable and/or interactive graphic), can provide access to multiple modes (e.g., copy, define, note, and/or highlight modes) that a user can invoke. The mode invoked determines the functions performed by the tool when interacting with the paginated digital content. The annotation mode, which may be invoked using the multi-purpose tool or independently thereof, can allow a user to create and edit annotations, such as highlights and notes (e.g., sticky notes, margin notes, and/or highlight notes), for paginated digital content. For example, a user may create a sticky note by tapping on the paginated content when the annotation mode is invoked, and the sticky note may be converted to a margin note (e.g., by toggling between the note types) or a highlight note (e.g., by dragging and dropping the sticky note onto a previously created highlight). Editing the annotations may include selecting the desired color for the annotation, for example. The annotation mode may also allow a user to intuitively merge and delete annotations previously added to paginated digital content. Numerous other configurations and variations will be apparent in light of this disclosure.

General Overview

As previously explained, electronic computing devices such as tablets, eReaders, and smart phones are commonly used for displaying user interfaces and digital content. The user of such devices can typically consume the displayed digital content with relative ease. In some instances, the content being consumed, such as electronic books (eBooks), magazines, catalogs, comics, or other digital documents, may be divided into individual pages. Some applications or user interfaces of the devices provide the ability to interact with such paginated content, including copying text from the content, defining words within the content, or annotating the content. However, such conventional techniques require the user to first select the text of interest and then select the function of interest. In addition, such conventional techniques typically allow only limited functionality with respect to annotating paginated digital content, which may lead to a diminished user experience.

Thus, and in accordance with one or more embodiments of the present invention, features and techniques are disclosed for interacting with paginated digital content presented/displayed by an electronic computing device. The features and techniques may include, in some embodiments, a multi-purpose tool that can provide access to multiple modes (e.g., copy mode, define mode, highlight mode, note mode, etc.) that a user can invoke. The mode invoked determines the functions performed by the tool when interacting with the paginated digital content. The multi-purpose tool may be represented, for instance, by a graphic (e.g., a movable and/or interactive graphic) that provides access to the modes using various suitable input to invoke a desired mode (e.g., tap/select on the tool graphic to expand then tap/select desired mode, tap/select on the tool graphic to expand then swipe to desired mode, swipe in direction of desired mode from the tool graphic, etc.). For example, the multi-purpose tool may be used in a highlight mode that, when invoked, allows a user to intuitively swipe over text of the paginated digital content to add highlighting to the text. In such an example, the color of the highlighting may be simultaneously selected when invoking the highlight mode, as will be apparent in light of this disclosure. In another example, the multi-purpose tool may be used in a define mode that, when invoked, allows a user to intuitively tap on or select the desire word to be defined, causing the definition to be presented. Other example modes accessible from the multi-purpose tool will be apparent in light of this disclosure.

The features and techniques for interacting with paginated digital content may also include, in some embodiments, an annotation mode that allows a user to create and edit annotations for the paginated digital content. Annotations may include, for example, highlighting or notes. Thus, in some embodiments, all or portions of the highlight and note modes (as variously described herein) may be integrated into a single annotation mode, as will be apparent in light of this disclosure. Highlighting generally refers to a selection of content (e.g., textual content) affected with a distinct coloration of that content. A note generally refers to user generated content that can be typed or hand-written or otherwise provided over or next to existing content. As previously described, a user may be able to create highlighting by dragging over text of paginated digital content when a highlight mode is invoked (or more generally, in some embodiments, when an annotation mode is invoked). After the highlighting has been added to the paginated content, the user may be able to edit the highlighting, in some embodiments, by changing the color of the highlighting and/or by expanding/contracting the textual coverage of the highlighting, for example.

In some embodiments, a user may be able to create a sticky note by tapping on or selecting paginated digital content when a note mode is invoked (or more generally, in some embodiments, when an annotation mode is invoked). In some such embodiments, a sticky note may be created on the paginated digital content at the tap or selection location. Sticky notes, in some embodiments, may be represented by a graphic (e.g., a movable and/or interactive graphic) that provides access to the contents of the sticky note. In some such embodiments, after a sticky note has been created, the user may be able to edit the contents of the sticky note using, for example, an edit box that is presented when the sticky note icon is tapped on or selected. The edit box may also allow the user to change the color of the sticky note or otherwise edit the sticky note, as will be apparent in light of this disclosure.

In some embodiments, a user may be able to create a margin note from a previously created sticky note by converting the sticky note to a margin note. In some such embodiments, the sticky note edit box may include a toggle tool to allow the user to switch between the note types. Margin notes may differ from sticky notes, in some instances, in that margin notes always present/show the contents of the note whereas sticky notes may be represented by a graphic/icon that can be tapped on or selected (or otherwise interacted with) to present/show its contents. Sticky notes and margin notes, in some embodiments, may be capable of being moved anywhere on the paginated content. In some embodiments, a user may be able to create a highlight note by dragging and dropping a previously created sticky note onto previously created highlighting. In some such embodiments, the highlight note retains the color of the sticky note and does not inherit the color of its associated highlight. In some embodiments, a highlight note may be detached from its associated highlight to change it back to a sticky note by, for example, dragging and dropping the highlight note away from the highlighting. Note that in some embodiments, a margin note can be positioned over highlighting (compared to sticky notes, in some embodiments, where attempting to position a sticky note over highlighting may instead convert the sticky note to a highlight note as previously described).

In some embodiments, the annotation mode may also allow a user to further interact with annotations (e.g., highlights and notes) added to paginated digital content. Such interactions may include intuitively merging and deleting annotations as well as being able to view a filtered list of and search the annotations. In some embodiments, merging annotations may include dragging and dropping one annotation onto (or over) another to merge the two annotations together. For example, in some embodiments, sticky notes can be merged by performing a press-and-hold on a sticky note to grab it, dragging the grabbed sticky note to another sticky note, and then dropping the grabbed sticky note onto the other sticky note to merge the two notes together. In another example, in some embodiments, highlights can be merged together by dragging/expanding and dropping one highlight over another to merge the two highlights together. In some embodiments, deleting annotations may include tapping or selecting a deletion graphic associated with the annotation or performing a press-and-hold then flick input on the annotation (e.g., to throw the annotation off of the screen and delete it). Other suitable annotation merge and delete features and techniques will be apparent in light of this disclosure. In some embodiments, annotation merges and/or deletions may be able to be undone using an undo input (e.g., shake input or a Z-shaped gesture input), as will also be apparent in light of this disclosure.

In some embodiments, the features for interacting with paginated digital content (e.g., a multi-purpose tool, an annotation mode, merging/deleting/filtering/searching annotations functionality, etc.) may be configured at a global level (e.g., based on the UI settings of the device) and/or at an application level (e.g., based on the specific application being used to interact with the paginated digital content). For example, one or more of the features may be configured to be enabled for some applications and disabled for others. To this end, one or more of the features may be user-configurable, hard-coded, or some combination thereof (e.g., where some aspects are user-configurable and others are hard-coded), as will be apparent in light of this disclosure. Further, one or more of the features for interacting with paginated digital content may be included initially with the UI (or operating system) of an electronic computing device or be included in a separate program/service/application configured to interface with the UI of such a device to incorporate the functionality of such features as variously described herein. In some embodiments, one or more of the features for interacting with paginated digital content may come in the form of a computer program product (one or more non-transient computer readable mediums) that includes a plurality of instructions non-transiently encoded thereon, that when executed by one or more processors, cause a process to be carried out that includes the functionality of one or more of the features as variously described herein.

As will be apparent in light of this disclosure, the features and techniques described herein (e.g., a multi-purpose tool, an annotation mode, merging/deleting/filtering/searching annotations functionality, etc.) may be used with any paginated or similarly divided digital content such as, for example, eBooks, magazines, catalogs, comics, documents, notes, presentations, lecture materials, photo albums, and/or any other suitable paginated or similarly divided digital content. As will also be apparent, the features for interacting with paginated digital content may be used on any suitable electronic computing device, such as various smartphones, tablets, and eReaders. In such devices including a touch-sensitive UI, user input may be referred to as contact or user contact for ease of reference. However, direct and/or proximate contact (e.g., hovering within a few centimeters of the touch-sensitive surface) may be used to provide user input to the device, depending on the specific touch-sensitive surface/interface being used. In other words, in some embodiments, a user need not even physically touch the device or its touch-sensitive surface/interface to provide input. Also note that the user contact (whether direct or proximate) may be provided by the user's hand (or another suitable body part), or a stylus (or some other suitable implement), for example. In some embodiments, user input may be provided in various other ways, such as using mouse gestures for devices that accept mouse input (e.g., desktop, laptop, tablet computers) or through voice commands or sounds, or through any other suitable method. Numerous variations and configurations will be apparent in light of this disclosure.

Computing Device and Configuration Examples

FIG. 1a illustrates an example electronic computing device configured in accordance with one or more embodiments of the present invention. The device (or one or more of its components) may include numerous features for interacting with paginated digital content, such as a multi-purpose tool, an annotation mode, a merge annotations function, and/or a delete annotations function as variously described herein. The device could be, for example, a tablet such as the NOOK® tablet by Barnes & Noble®. In a more general sense, the device may be any computing device capable of displaying digital content, such as a smart phone, eReader, tablet computer, laptop, or desktop computer, for example. In some instances, the computing device may be touch-sensitive and include a touch screen display or a non-touch-sensitive display screen that can be used in conjunction with a touch-sensitive surface/interface, such as a track pad. As will be appreciated in light of this disclosure, the present disclosure is not intended to be limited to any particular kind or type of computing device. For ease of description, an example computing device is provided herein with touch screen technology.

As can be seen with the example embodiment shown in FIG. 1a, the device comprises a housing/frame that includes a number of hardware features such as a power button and a press-button (sometimes called a home button herein). A touch screen based user interface (UI) is also provided (although a computing device running one or more of the features for interacting with paginated digital content as described herein need not be touch-sensitive), which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI touch screen controls and features, or different UI touch screen controls and features altogether, depending on the target application of the device. Any such general UI touch or non-touch controls and features can be implemented using any suitable conventional or custom technology, as will be appreciated.

Although the computing device shown in FIG. 1a uses a touch screen display, other touch-sensitive embodiments may include a non-touch screen and a touch-sensitive surface such as a track pad, or a touch-sensitive housing configured with one or more acoustic sensors, etc. As previously described, the computing device need not be touch-sensitive and may receive input from physical buttons, directional pads, joysticks, mouse pointing devices, and physical keyboards, just to name a few other input device examples. Continuing with the example computing device shown in FIG. 1a, the power button can be used to turn the device on and off, and may be used in conjunction with a touch-based UI control feature that allows the user to confirm a given power transition action request (e.g., such as a slide bar or tap point graphic to turn power off). In this example device, the home button is a physical press-button that can be used to display the device's home screen when the device is awake and in use. Note that the buttons as variously described herein may be physical, virtual, or some combination thereof, depending upon the embodiment. The home button (or other buttons) may also be used in conjunction with the features as disclosed herein to, for example, exit the annotation mode after it has been invoked. Numerous other configurations and variations will be apparent in light of this disclosure, and the present disclosure is not intended to be limited to any particular set of control features or device form factor.

Figure 1B:
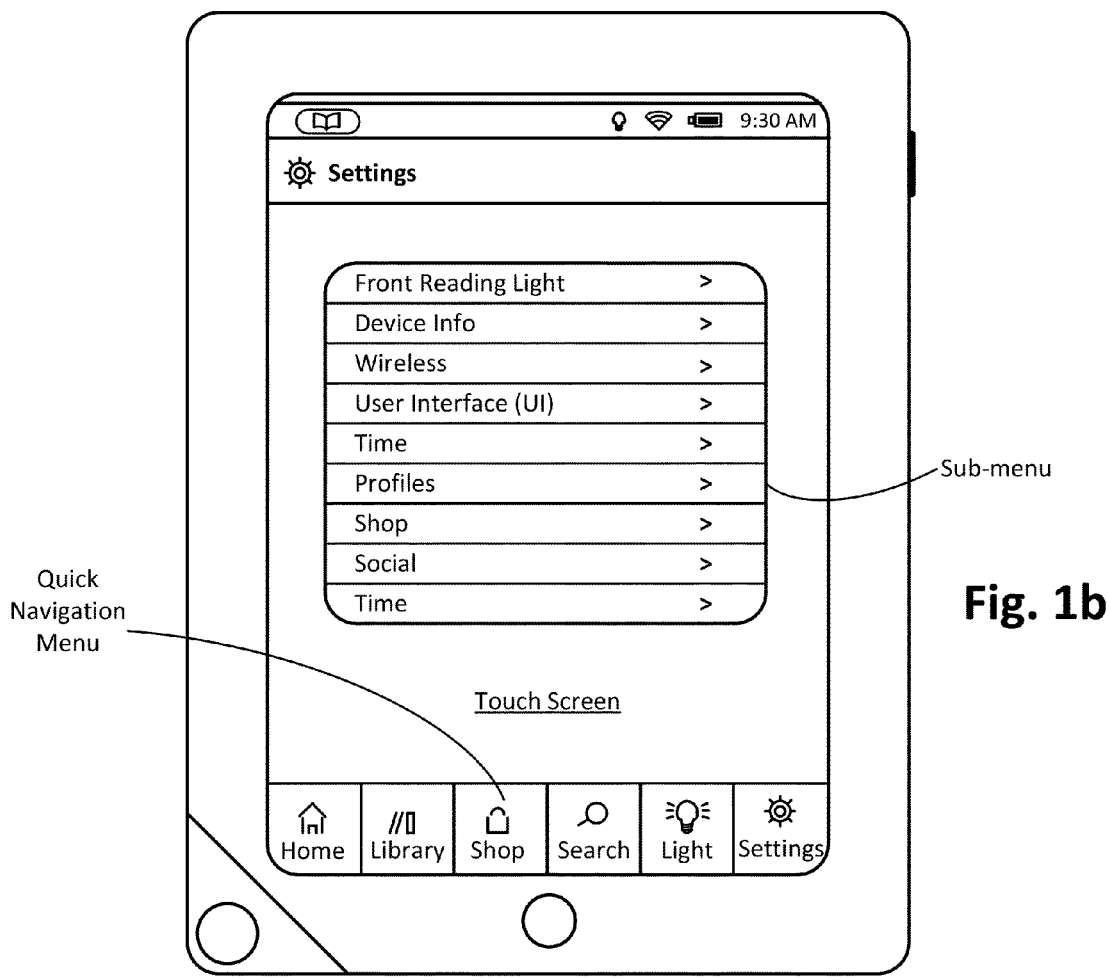
FIGS. 1b-f illustrate example configuration screen shots of the user interface of the computing device shown in FIG. 1a, in accordance with one or more embodiments of the present invention.
Figure 1C:
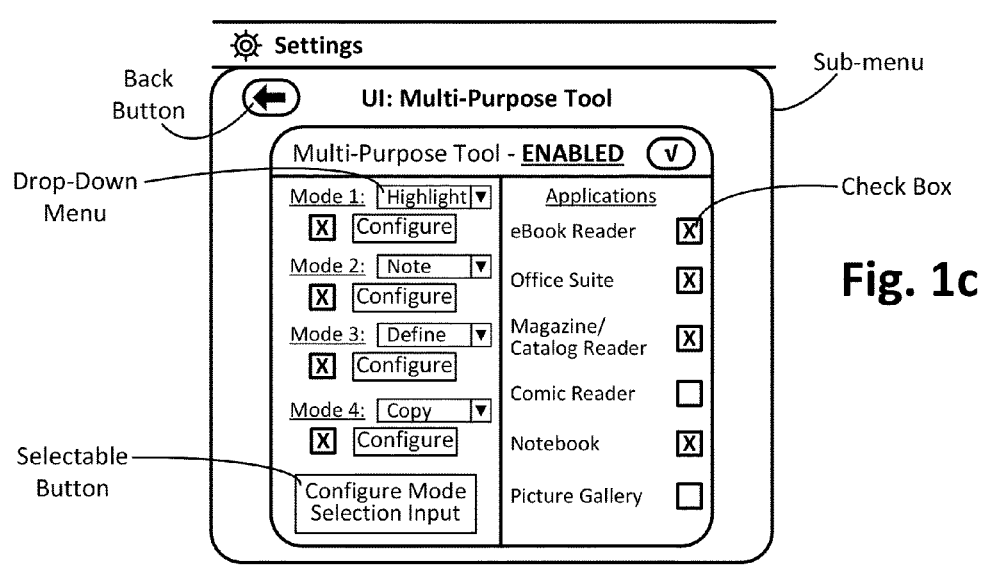
Figure 1D:
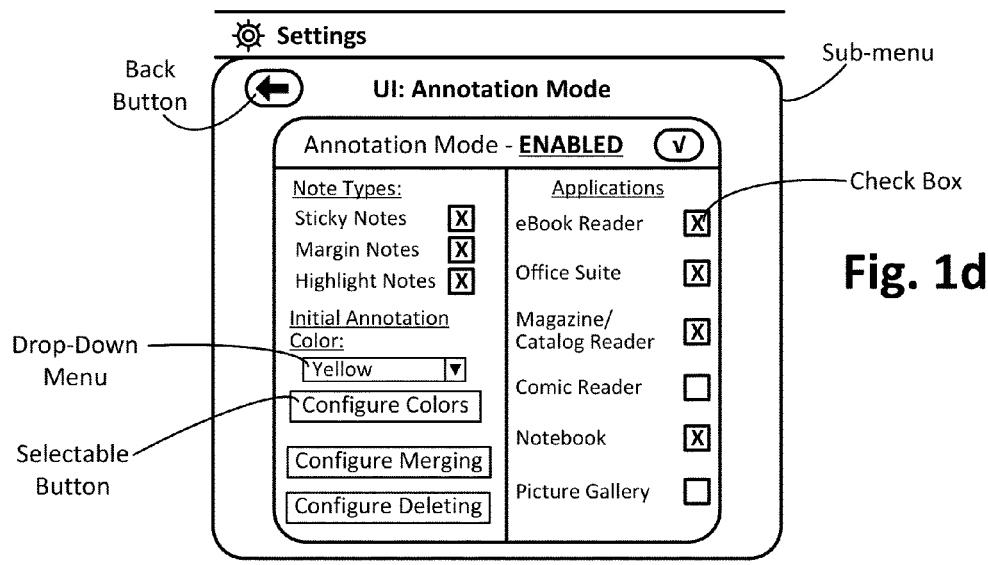

Continuing from FIG. 1a, the user can access a configuration sub-menu, such as the Multi-Purpose Tool configuration sub-menu shown in FIG. 1c or the Annotation Mode configuration sub-menu shown in FIG. 1d, by tapping or otherwise selecting the Settings option in the quick navigation menu, which causes the device in this embodiment to display the general sub-menu shown in FIG. 1b. From this general sub-menu the user can select any one of a number of options, including one designated User Interface (UI) in this specific example case. Selecting this sub-menu item (with, for example, an appropriately placed screen tap) may cause the configuration sub-menu of FIG. 1c or 1d to be displayed, in accordance with an embodiment. In other example embodiments, selecting the User Interface (UI) option may present the user with a number of additional sub-options, one of which may include an eReader option, which may then be selected by the user so as to cause the configuration sub-menu of FIG. 1c or 1d to be displayed. Any number of such menu schemes and nested hierarchies can be used, as will be appreciated in light of this disclosure. In other embodiments, the features for interacting with paginated digital content as variously described herein (e.g., a multi-purpose tool, an annotation mode, merging/deleting/filtering/searching annotations functionality, etc.) may be hard-coded such that no configuration is needed or otherwise permitted. The degree of hard-coding versus user-configurability can vary from one embodiment to the next, and the present disclosure is not intended to be limited to any particular configuration scheme of any kind, as will be apparent in light of this disclosure.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates one or more touches (whether direct or proximate and whether made by a user's hand, a stylus, or some other suitable implement) in a particular location(s) into an electrical signal, which is then received and processed by the underlying operating system (OS), system software, and circuitry (processor, etc.) of the computing device. In some instances, note that the user need not actually physically touch the touch-sensitive surface/interface to provide user input (e.g., when the touch-sensitive surface/interface recognizes hovering input). In embodiments where the computing device is not-touch-sensitive, input may be provided using a mouse, joystick, or directional pad, and one or more buttons, for example, to provide input similar to touching a touch screen. In some embodiments, the UI may allow other user interactions, such as voice-commands. Additional example details of the underlying OS and circuitry in accordance with some embodiments will be discussed in turn with reference to FIG. 2a. As previously explained, in some cases, the features for interacting with paginated digital content as variously described herein (e.g., a multi-purpose tool, an annotation mode, merging/deleting/filtering/searching annotations functionality, etc.) may be automatically configured by the specific UI or application being used. In these instances, the features need not be user-configurable (e.g., if the features are hard-coded or are otherwise automatically configured).

Continuing with FIG. 1b, once the Settings sub-menu is displayed, the user can then select the User Interface (UI) option. In response to such a selection, the Multi-Purpose Tool configuration sub-menu shown in FIG. 1c or the Annotation Mode configuration sub-menu shown in FIG. 1d can be provided to the user. Alternatively, the Annotation Mode configuration sub-menu shown in FIG. 1d may be accessed through the Multi-Purpose tool sub-menu using, for example, a Configure button corresponding to an Annotation Mode, Highlight Mode, or Note Mode (e.g., as shown in FIG. 1c). In the example case shown in FIG. 1c, the Multi-Purpose Tool configuration sub-menu includes a UI check box that when checked or otherwise selected by the user, effectively enables the tool (shown in the Enabled state); unchecking the box disables the tool. Other embodiments may have the multi-purpose tool always enabled, or enabled by a switch or button, for example. In some instances, the multi-purpose tool may be automatically enabled in response to an action, such as when paginated digital content is displayed (or otherwise presented to the user) or a specific application is launched, for example. As previously described, the user may be able to configure some or all of the features with respect to the multi-purpose tool, so as to effectively give the user a say in, for example, which modes the multi-purpose tool provides access to, configuration of the accessible modes, how to invoke the accessible modes from the multi-purpose tool, and/or other suitable configuration options as will be apparent in light of this disclosure, if so desired.

In the example case shown in FIG. 1c, once the multi-purpose tool is enabled, the user can configure various options related to this example tool. As shown, the left side of this example settings screen shot includes multiple configurable options. Such options include the ability to select how many modes the tool can provide access to (e.g., by selecting the check boxes under each mode) and what specific modes those are. In this example configuration, the tool includes four potential modes (Modes 1-4) and all four are shown in an enabled state (each mode check box is selected). In other embodiments, the multi-purpose tool may provide access to more modes, such as eight potential modes, or less modes, such as two potential modes. As can be seen in this example configuration, Mode 1 is set as a Highlight Mode, Mode 2 is set as a Note Mode, Mode 3 is set as a Copy Mode, and Mode 4 is set as a Define Mode, each of which are discussed in more detail herein. The modes (Modes 1-4) have been set using the respective drop-down menus and each mode includes a respective selectable Configure button that allows a user to further configure the set modes. Other modes may include an annotation mode, a lookup mode, a cut mode, and a delete mode, as will be apparent in light of this disclosure. An example of a settings sub-menu showing additional configuration options for an annotation mode is shown in FIG. 1d and will be discussed in more detail below.

The left side of the settings screen shot also includes a Configure Mode Selection Input button, that may allow a user to configure how the modes (e.g., Modes 1-4 in this example) are selected using the multi-purpose tool. Such selection input options may include being able to swipe in the direction of the desired mode, selecting (or tapping on) the tool to show the modes available and then selecting (or tapping on) the desired mode, or any other suitable input as will be apparent in light of this disclosure. For example, the selection input may be set such that Mode 1 can be invoked by swiping rightward from the multi-purpose tool, Mode 2 can be invoked by swiping leftward from the tool, Mode 3 can be invoked by swiping upward from the tool, and Mode 4 can be invoked by swiping downward from the tool. The right side of the example settings screen shot including the Applications section will be discussed in more detail below.

In the example case shown in FIG. 1d, once the annotation mode is enabled, the user can configure various options related to this example mode. In some embodiments, the mode may be set as one of the modes accessible from the multi-purpose tool (e.g., as shown in FIG. 1c); however, in other embodiments, the annotation mode may also be its own separate feature external to the multi-purpose tool. As will be apparent in light of this disclosure, the annotation mode may also include the functionality of the highlight and note modes as variously described herein. Therefore, the annotation mode may allow a user to highlight and/or add notes to paginated digital content. The annotation mode in this example case includes three different note types (Sticky Notes, Margin Notes, and Highlight Notes), which can be enabled/disabled using the respective boxes under the Note Types section of the sub-menu in FIG. 1d. This example settings sub-menu also allows a user to set the Initial Annotation Color (e.g., the initial color for highlighting and/or for created notes) using the corresponding drop-down menu (set as Yellow in this example embodiment). The user may also select the Configure Colors button to further configure color options, such as which colors are available to be selected when highlighting and/or creating notes on paginated digital content. The three different note types (sticky, margin, and highlight notes) are discussed in more detail herein.

Figure 1E:
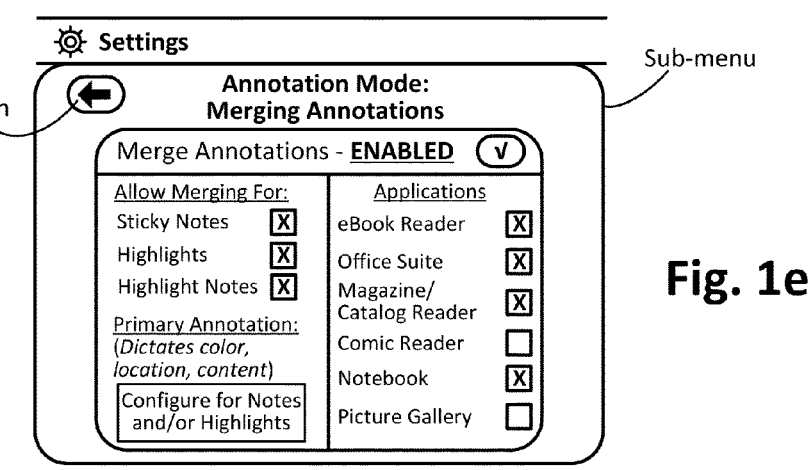
Figure 1F:
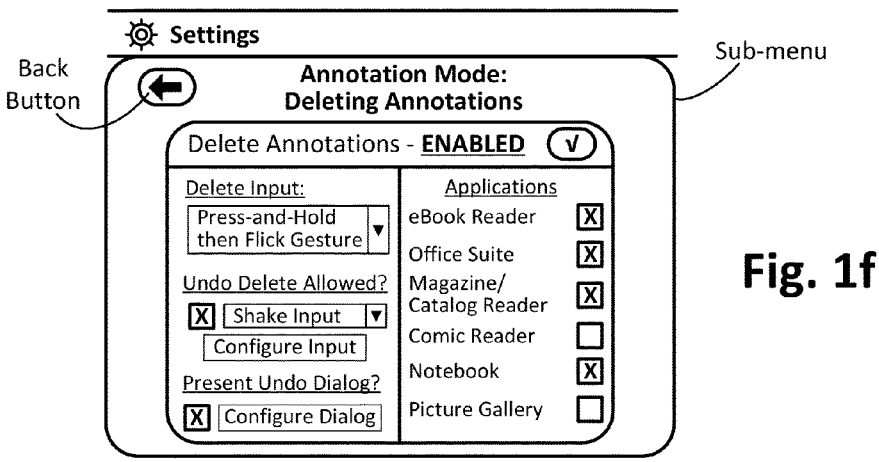

The example Annotation Mode setting screen shot shown in FIG. 1d also includes two selectable buttons to Configure Merging and Configure Deleting for the annotation mode. In this example case, selection of the Configure Merging button may cause the example Annotation Mode Merging Annotations settings sub-menu to be presented as shown in FIG. 1e, and selection of the Configure Deleting button may cause the example Annotation Mode: Deleting Annotations settings sub-menu to be presented as shown in FIG. 1f. However, such sub-menus may be accessed in another suitable manner, and in some embodiments, the merging annotations functionality and deleting annotations functionality (as will be discussed in more detail herein) may be a feature of or separate from an annotation mode. As will be apparent in light of this disclosure, the merging annotations and deleting annotations functionality may be applicable to highlighting and/or adding notes to paginated digital content.

FIG. 1e shows the Merge Annotations functionality as enabled in this example sub-menu screen shot. As can also be seen, the user can Allow Merging For Sticky Notes, Highlights, and/or Highlight Notes by selecting the note type's corresponding check box (shown with merging allowed/enabled for all three). Note that margin notes cannot be merged, as will be apparent in light of this disclosure. In this example settings sub-menu, the user can also select the Primary Annotation when merging annotations. This configuration option allows a user to configure whether the annotation being dragged (e.g., the highlight or note being dragged) or the annotation dragged to (e.g., the highlight being dragged to or the note being dropped on) dictates the color of the annotation, the location of the annotation, and/or the initial content of a resulting note associated with the merged annotations. Such a feature of the merging annotations functionality will be discussed in more detail herein, and the example screen shot shown in FIG. 1e is provided to illustrate that such a feature may be user-configurable (however, such a feature may also be hard-coded).

FIG. 1f shows the Delete Annotations functionality as enabled in this example sub-menu screen shot. As can also be seen, the user can select a Delete Input using the corresponding drop-down menu. The selected delete input shown is a Press-and-Hold then Flick Gesture. Other delete input may include selecting an associated deletion graphic related to an annotation (e.g., an "X" or garbage can icon), or other suitable input as will be apparent in light of this disclosure. The delete annotations functionality may also allow for more than one delete input, such as allowing both the press-and-hold then flick gesture input and selection of an associated deletion graphic related to an annotation to provide delete input. The Delete Annotations sub-menu shown in this example case also allows a user to select if Undo Delete is Allowed (shown enabled). The undo delete feature allows a user to undo the deletion of an annotation using, for example, the input selected in the corresponding drop-down menu. As can be seen, the undo input is set as a Shake Input (and can be further configured using the Configure Input button), which may be invoked by shaking the computing device (as will be discussed in more detail herein). Other undo delete input may include a Ctrl+Z command, inputting a Z-shaped gesture, selecting an undo button, or other suitable input as will be apparent in light of this disclosure. The delete annotations functionality may also allow for more than one undo delete input, such as a shake input and inputting a Z-shaped gesture, for example. The delete annotations feature also includes a Present Undo Dialog configuration option (shown enabled), which presents a selectable option to undo the deletion of an annotation. Such a dialog may be presented only after an annotation has been deleted or only when one or more annotation deletions can be undone (as will be discussed in more detail herein), and the feature may be further configured using the Configure Dialog button shown.

The right side of the example settings sub-menu screen shots shown in FIGS. 1c-f include Applications sections that allow a user to individually enable the features for interacting with paginated digital content (e.g., a multi-purpose tool, an annotation mode, merging/deleting/filtering/searching annotations functionality, etc.) for specific applications, in one or more embodiments. Such a configuration feature may be helpful, for instance, in a tablet or laptop or other multifunction computing device that can execute different applications (as opposed to a computing device that is more or less dedicated to a particular application). As previously explained, in some embodiments, the features for interacting with paginated digital content may be application specific or configured at an application level. As can be seen in the example screen shots shown in FIGS. 1c-f, the features are enabled for the eBook Reader, Office Suite, Magazine/Catalog Reader, and Notebook applications. For completeness of description, the features are disabled for the Comic Reader and Picture Gallery, in this example case, such that the features may not even be presented or available in the applications. In some embodiments, one or more of the features may be later enabled from this settings screen or enabled from the specific application itself.

In some embodiments, one or more of the features for interacting with paginated digital content (e.g., a multi-purpose tool, an annotation mode, merging/deleting/filtering/searching annotations functionality, etc.) may be related or tied to one or more specific applications of the device's UI (or operating system), such that the feature(s) is only available, active, or running when such an application is available, active, or running. For example, the multi-purpose tool may only be available, active, or running when an eReader application is active and/or displayed, which may save a computing device's memory and/or power consumption. Any number of applications or device functions may benefit from the features for interacting with paginated digital content as provided herein, whether user-configurable or not, and the present disclosure is not intended to be limited to any particular application or set of applications.

As can be further seen in FIGS. 1c-f, a back button arrow UI control feature may be provisioned on the touch screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. Again, while FIGS. 1c-f show user-configurability, other embodiments may allow for a different configuration scheme or they may not allow for any such configuration, wherein the various features provided are hard-coded or otherwise provisioned by default. The degree of hard-coding versus user-configurability can vary from one embodiment to the next, and the present disclosure is not intended to be limited to any particular configuration scheme of any kind.

Architecture

Figure 2A:
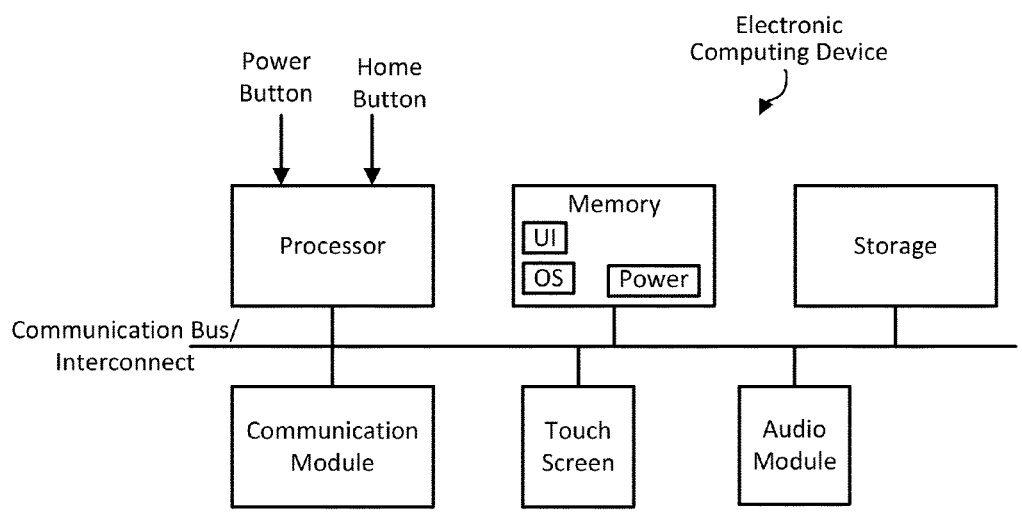
FIG. 2a illustrates a block diagram of an electronic computing device, configured in accordance with an embodiment of the present invention.

FIG. 2a illustrates a block diagram of a computing device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc.). Further note that although a touch screen display is provided, other touch-sensitive embodiments may include a non-touch screen and a touch-sensitive surface such as a track pad, or a touch-sensitive housing configured with one or more acoustic sensors, etc. In this manner, a non-touch-sensitive computing device can become a touch-sensitive computing device by adding an interfacing touch-sensitive component. However, as previously explained, some embodiments may be non-touch-sensitive. The principles provided herein equally apply to any such computing device. For ease of description, examples are provided with touch screen technology.

The touch-sensitive surface (touch-sensitive display or touch screen, in this example) can be any device that is configured with user input detecting technologies, whether capacitive, resistive, acoustic, active or passive stylus, and/or other input detecting technology. The screen display can be layered above input sensors, such as a capacitive sensor grid for passive touch-based input (e.g., with a finger or passive stylus in the case of a so-called in-plane switching (IPS) panel), or an electro-magnetic resonance (EMR) sensor grid (e.g., for sensing a resonant circuit of the stylus). In some embodiments, the touch screen display can be configured with a purely capacitive sensor, while in other embodiments the touch screen display may be configured to provide a hybrid mode that allows for both capacitive input and active stylus input. In any such embodiments, a touch screen controller may be configured to selectively scan the touch screen display and/or selectively report contacts detected directly on or otherwise sufficiently proximate to (e.g., within a few centimeters) the touch screen display. The proximate contact may include, for example, hovering input used to cause location specific input as though direct contact were being provided on a touch-sensitive surface (such as a touch screen). Numerous touch screen display configurations can be implemented using any number of known or proprietary screen based input detecting technology.

Continuing with the example embodiment shown in FIG. 2a, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc.), and encoded on a machine readable medium, that when executed by the processor (and/or co-processors), carries out the functionality of the device, including one or more of the features for interacting with paginated digital content (e.g., a multi-purpose tool, an annotation mode, merging/deleting/filtering/searching annotations functionality, etc.) as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., Texas Instruments OMAP4, dual-core ARM Cortex-A9, 1.5 GHz), and may include one or more co-processors or controllers to assist in device control. In this example case, the processor receives input from the user, including input from or otherwise derived from the power button, home button, and touch-sensitive surface. In other embodiments, the processor may be configured to receive input from other input devices, such as from a mouse or keyboard, for example, to determine if such devices are being used to provide input. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory).

The display can be implemented, for example, with a 7 to 9 inch 1920×1280 IPS LCD touchscreen touch screen, or any other suitable display and touch-sensitive interface technology. The communications module can be, for instance, any suitable 802.11b/g/n WLAN chip or chip set, which allows for connection to a local network so that content can be downloaded to the device from a remote location (e.g., content provider, etc., depending on the application of the display device). In some specific example embodiments, the device housing or frame that contains all the various componentry measures about 7" to 9" high by about 5" to 6" wide by about 0.5" thick, and weighs about 7 to 8 ounces. Any number of suitable form factors can be used, depending on the target application (e.g., laptop, smart phone, etc.). The device may, for example, smaller for smart phone and eReader applications and larger for tablet computer applications.

The operating system (OS) module can be implemented with any suitable OS, but in some example embodiments is implemented with Google Android OS or Linux OS or Microsoft OS or Apple OS. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The audio module can be configured, for example, to speak or otherwise aurally present a selected eBook or other textual content. In some example cases, if additional space is desired, for example, to store digital books or other content and media, storage can be expanded via a microSD card or other suitable memory expansion technology (e.g., 32 GBytes, or higher). The UI module can be, for example, based on touch screen technology, and the various example screen shots and example use-cases shown in FIGS. 1a-f and FIGS. 3a-13c (including all intervening Figures), in conjunction with the methodologies demonstrated in FIGS. 14 and 15, which will be discussed in turn.

Client-Server System

Figure 2B:
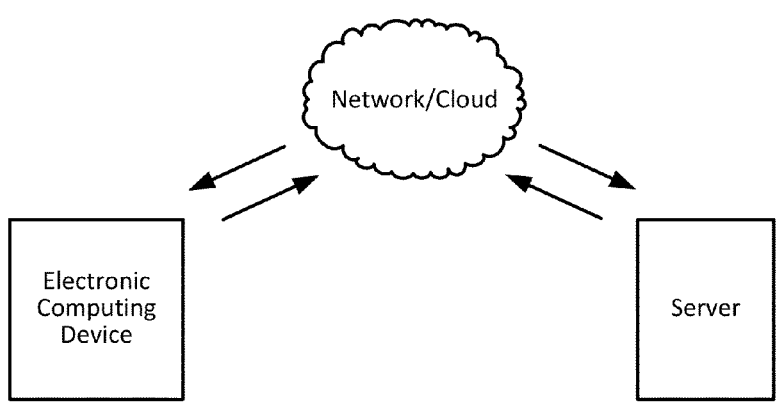
FIG. 2b illustrates a block diagram of a communication system including the electronic computing device of FIG. 2a, configured in accordance with an embodiment of the present invention.

FIG. 2b illustrates a block diagram of a communication system including the electronic computing device of FIG. 2a configured in accordance with an embodiment of the present invention. As can be seen, the system generally includes an electronic computing device that is capable of communicating with a server via a network/cloud. In this example embodiment, the computing device may be, for example, an eReader, a smart phone, a laptop, a tablet computer, a desktop computer, or any other suitable computing device. The network/cloud may be a public and/or private network, such as a private local area network operatively coupled to a wide area network such as the Internet. In this example embodiment, the server may be programmed or otherwise configured to receive content requests from a user via the computing device and to respond to those requests by providing the user with requested or otherwise recommended content. In some such embodiments, the server may be configured to remotely provision one or more of the features as variously provided herein for interacting with paginated digital content (e.g., a multi-purpose tool, an annotation mode, merging/deleting/filtering/searching annotations functionality, etc.) to the computing device (e.g., via JavaScript or other browser based technology). In other embodiments, portions of the methodology may be executed on the server and other portions of the methodology may be executed on the device. Numerous server-side/client-side execution schemes can be implemented to facilitate the features as disclosed herein for interacting with paginated digital content in accordance with one or more embodiments, as will be apparent in light of this disclosure.

Multi-Purpose Tool and Example Modes

Figure 3I:
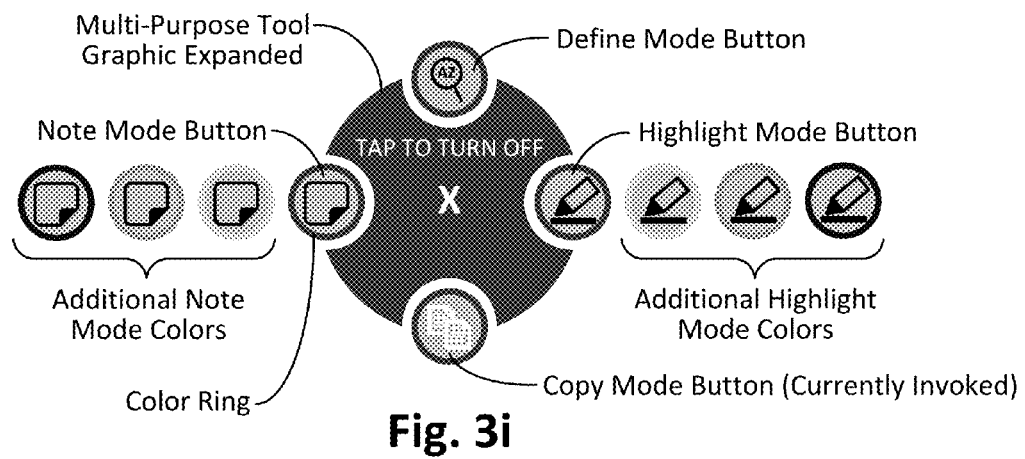

FIGS. 3a-m collectively illustrate an example multi-purpose tool for an electronic computing device, configured in accordance with one or more embodiments of the present invention. As can be seen in FIG. 3a, the electronic computing device is shown having a housing/frame that includes a touch screen for displaying content and allowing user input (whether direct or proximate). The touch screen in FIG. 3a is displaying a page of an eBook, and more specifically, page 10 of the eBook "Great Expectations." The eBook may be displayed or otherwise presented using an eReader application, or some other suitable application or program. Although the multi-purpose tool (and other features for interacting with paginated digital content) is being illustrated on a touch-sensitive device having a touch screen, other touch-sensitive devices may include a non-touch display screen that can be used in conjunction with a touch-sensitive surface/interface, such as a track pad, as previously described. As was also previously described, the multi-purpose tool (and other features for interacting with paginated digital content) may be used on a non-touch-sensitive computing device; however, a touch-sensitive computing device is used herein for ease of description.

As will be apparent in light of this disclosure, and in accordance with one or more embodiments, the multi-purpose tool can provide access to multiple modes to allow a user to invoke one of the modes using the tool. Once a mode has been invoked, a function can be performed determined by the invoked mode in response to user input performed on the paginated digital content. Such techniques are described herein with respect to a copy mode, define mode, highlight mode, and note mode for illustrative purposes; however, the present disclosure is not intended to be limited to the specific modes or corresponding functionality as variously described herein. Note that the highlight mode and note mode, and corresponding functionality of each mode, may be referred to collectively herein as an annotation mode. Also note that in some embodiments, the modes described herein may be separate from the multi-purpose tool, such that they can be invoked in another manner. Further note that the multi-purpose tool may be configured to lock the page currently being presented/displayed upon the invocation of one or more modes to allow for the input to be recognized. For example, if the multi-purpose tool is being used by an eReader application that allows a user to turn pages using swipe gestures, and one of the modes uses a swipe or drag gesture input to perform a function (other than turning the page), then the multi-purpose tool may be configured to lock the currently presented/displayed page, to allow the appropriate function to be performed on that page. In some embodiments, the multi-purpose tool may be configured to allow page turning input, even when a mode is invoked. In some such embodiments, a user may be able to swipe from the right and left edges of the computing device (e.g., a smart phone or tablet) to turn pages of the paginated digital content. In such cases, because the user is swiping over white margin space, and not swiping over text, the multi-purpose tool (and/or an invoked mode) may determine that a page turn is desired based on the input (e.g., instead of highlighting the text when the highlight mode is invoked).

FIG. 3a shows a multi-purpose tool graphic at the bottom center of the paginated digital content on the touch screen. As previously described, the multi-purpose tool may be represented by a graphic in some embodiments, and in this example embodiment, is represented with a movable interactive graphic. The tool graphic can be used to invoke modes accessible through the multi-purpose tool. In this example embodiment, the tool graphic is configured to be provisioned at the location seen in FIG. 3a by default for such a portrait layout/display and to be provisioned on the bottom center of a the left most page in a multi-page layout (e.g., a two page magazine-style layout that may be used when the device is in a landscape orientation). Other embodiments may provision the tool graphic in different locations by default and in some embodiments, a user may be able to configure the default graphic location. In some embodiments, the previous position of the tool graphic may be remembered, even when opening new paginated digital content. Such a default tool graphic location may be reset every time that paginated digital content is opened, for example. Note that the multi-purpose tool graphic is shown is provided for illustrative purposes only and the present disclosure is not intended to be limited to, for example, the shape, size, or colors shown.

FIGS. 3b-3d illustrate moving the multi-purpose tool graphic to a desired location, in accordance with an example embodiment. In this example embodiment, the tool graphic can be moved by performing a press-and-hold input on the graphic (shown being performed by a user's hand, and more specifically by a finger on the hand) to select the graphic as shown in FIG. 3b. Once the tool graphic is selected, it may grow and include a border (e.g., a translucent border) as can be seen in FIG. 3c. Other feedback (visual, aural, and/or tactile) may be provided to indicate that the tool graphic has been selected. Once selected, the user can drag the tool graphic to a desired location, such as the location shown in FIG. 3c in the bottom left corner of the touch screen. The user can then release the tool graphic in the desired location to reversibly lock it at that location as shown in FIG. 3d (such that it can be moved again using the same procedure in FIGS. 3b-3d). In some embodiments, the multi-purpose tool may be configured to allow the tool graphic to be moved in another suitable manner (e.g., shift key plus a selection on the tool graphic and then dragging the graphic to the desired location).

In other embodiments, the tool graphic may be permanently locked in one position (e.g., default hard-coded positions).

FIGS. 3e-h illustrate an example mode selection input from (or using) the multi-purpose tool graphic input to invoke a desired mode, in accordance with an example embodiment. In this example embodiment, the multi-purpose tool graphic shown in FIG. 3e can be tapped (or selected), as shown in FIG. 3f, to expand the tool graphic and present selectable mode graphics/icons/buttons as shown in FIG. 3g. The expanded tool graphic shown in FIG. 3g includes four different mode buttons, thereby providing access to invoke the modes by tapping on (or selecting) one of the buttons. The four mode buttons include a define mode button on top, a copy mode button on the bottom, a note mode button to the left, and a highlight mode button to the right. The expanded multi-purpose tool graphic also includes a selectable X in the middle that can be tapped (or selected) to turn off a currently invoked mode. FIG. 3h illustrates a user tapping on the copy mode button located on the bottom of the expanded multi-purpose tool graphic to invoke the copy mode. An example screen shot resulting from the selection can be seen in FIG. 4a, which will be discussed in more detail below.

FIG. 3i shows an alternate configuration for the expanded multi-purpose tool graphic, in accordance with an embodiment. As can be seen in this configuration, the four buttons previously described to invoke the corresponding four modes (define, copy, note, and highlight modes) are still presented. However, the alternate expanded tool graphic in this example also includes additional note and highlight mode color buttons, which can be selected to set the initial color of the note or highlight created when the mode is invoked. In this example embodiment, the color is shown for each button as a color ring surrounding the mode button (as indicated on the note mode button). Note that the color options presented may be hard-coded, user-configured, or some combination thereof. For example, the colors presented may be based on the last colors used to create the annotations (highlights or notes) in their respective modes. Also note that the copy mode button is shown in white to indicate that this is the currently invoked mode (e.g., as selected in FIG. 3h). With the copy mode invoked, a user can tap (or select) away from the expanded multi-purpose tool graphic to continue operating in the copy mode, can tap the X to turn off the copy mode (thereby resulting in mode being invoked), can select a different mode button to invoke the corresponding mode (e.g., select the define mode button to invoke the define mode), or perform some other suitable action (e.g., hit a back button to return to the paginated content with the copy mode invoked, hit the home button to exit the paginated content, etc.).

Figure 3J:
Figure 3K:
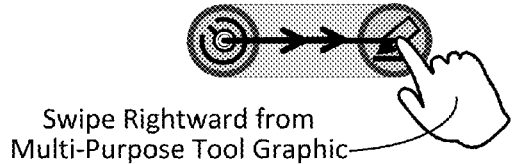
Figure 3L:
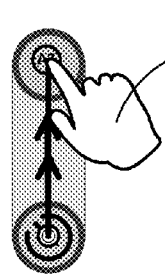
Figure 3M:
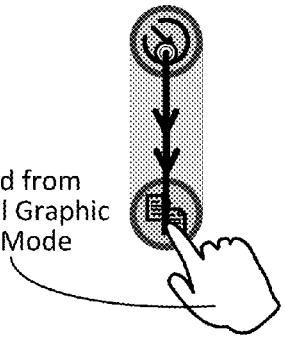

FIGS. 3j-m illustrate example mode selection input from (or using) the multi-purpose tool graphic input to invoke a desired mode, in accordance with an example embodiment. As can be seen, FIGS. 3j-m illustrate that the tool graphic may be configured to allow a user to swipe from the multi-purpose tool graphic in the direction of the desired mode to invoke that mode. More specifically, in this example, FIG. 3j illustrates swiping leftward from the tool graphic to invoke the note mode, FIG. 3k illustrates swiping rightward from the tool graphic to invoke the highlight mode, FIG. 3l illustrates swiping upward from the tool graphic to invoke the define mode, and FIG. 3m illustrates swiping downward from the tool graphic to invoke the copy mode. Note that such swipe gestures may be performed again to turn the previously invoked mode off, or a swipe gesture in a different direction may be used to invoke a different mode (and thereby turn the previously invoked mode off). In this example embodiment, the mode icon associated with the direction of the swipe gesture appears while swiping. However, the mode icon may not appear in some embodiments (e.g., the user can swipe in the direction of a known desired mode to invoke the mode). In some embodiments, the swiping mode selection input may be used in conjunction with the expanded multi-purpose tool graphic configuration, such that a user can initiate a swipe gesture on the tool graphic to expand the multi-purpose tool graphic and then swipe to the presented mode icon/button to invoke the corresponding mode. As previously described, the modes may also be invoked by tapping/selecting the tool graphic to expand the multi-purpose tool and then tapping/selecting the desired mode to be invoked, in some embodiments. Various other suitable mode selection input may be used to invoke a mode from the multi-purpose tool graphic and the present disclosure is not intended to be limited to the examples provided herein.

FIGS. 4a-d illustrate an example copy mode of an electronic computing device, configured in accordance with an embodiment of the present invention. The copy mode can be invoked using a multi-purpose tool graphic, such as is shown in FIG. 3h and previously described. As can be seen in FIGS. 4a-d, the multi-purpose tool graphic is displaying the copy mode icon to indicate that the copy mode is invoked. In some embodiments, the user may be able to turn off the currently invoked mode (e.g., the copy mode in this example case) by tapping/selecting the multi-purpose tool graphic. In this example embodiment, the copy mode allows a user to copy selected text. FIG. 4a shows a user tapping (or selecting) to initiate a drag, which can be used to select desired text. FIG. 4b shows a screen shot after the user has dragged to select the desired text section. FIG. 4c shows a screen shot after the user released the drag gesture. In this example embodiment, the selected text is shown in FIG. 4c and selected text section includes two handles on either end of the section that can be used to expand or contract the selection in either direction (from the handle's original location) by dragging the handle as desired. Note that one of the handles is also a copy selection tool that can be tapped/selected (as opposed to being dragged to expand/contract the selected text) to copy the selected text section. Also note that in some embodiments, the user may be able to use the handles to select text (to be copied) across multiple pages. Alternatively, the user may tap away from the selected text to cancel the copy function. In another example embodiment, the selected text may be automatically copied (e.g., to a clipboard), as soon as the user releases the drag gesture. Various visual, aural, and/or tactile feedback may be provided to indicate that the text was successfully copied, such as the text copied confirmation shown in FIG. 4d.

FIGS. 5a-d illustrate an example define mode of an electronic computing device, configured in accordance with an embodiment of the present invention. The define mode can be invoked using a multi-purpose tool graphic, as previously described. As can be seen in FIGS. 5a-d, the multi-purpose tool graphic is displaying the copy mode icon to indicate that the copy mode is invoked. In this example embodiment, the define mode allows a user to define a selected word. FIG. 5a shows a user tapping (or selecting) to select a desired word to be defined (in this example case, the word is "brambles"). FIG. 5b shows a screen shot including a pop-up definition box including the definition of the word. Note that the pop-up definition box has a scroll bar in this example embodiment to allow a user to scroll to see more of the contents of the definition. Also note that the definition in this example embodiment may be pulled from any number of sources, including a dictionary provided with the application being used to view paginated digital content (e.g., an eReader application). In other example embodiments, the definition of the selected word may be presented in another suitable manner, such as opening a web browser or external application to provide a definition of the word. Continuing with the example embodiment shown in FIG. 5b, the pop-up box may be closed by tapping outside of the box to close it, such as is shown in FIG. 5c. In some embodiments, the user can then select another word from the page displayed in FIG. 5d or navigate to another page and select a word to be defined. However, in other embodiments, the currently displayed/presented page (e.g., page 10 in this example case) may be locked such that the user cannot navigate away from the page until the define mode is turned off.

In some embodiments, a lookup mode may be invoked using the multi-purpose tool. When invoked, the lookup mode may allow a user to select a word to cause the definition of that word to be presented, similar to the functionality of the define mode. However, the lookup mode may also allow the user to obtain other information about selected words, phrases, or images, for example. In one or more embodiments, the lookup mode may allow a user to select one or more words to lookup those words using an internet search engine (e.g., Google® or Bing® search engines), using a language translation service (e.g., to translate selected English words to Spanish), or using an encyclopedia (e.g., Wikipedia® encyclopedia), for example. In another example, in one embodiment, the lookup mode may allow a user to select an image to lookup that image using an image recognition service (e.g., Google® search engine's search by image feature), for example. Numerous other lookup services may be used in conjunction with the lookup mode and, in some embodiments, the results of selecting a word, phrase, or image to lookup related information may be presented within the same application being used to present/display the paginated digital content.

FIGS. 6a-d illustrate an example highlight mode of an electronic computing device, configured in accordance with an embodiment of the present invention. The highlight mode can be invoked using a multi-purpose tool graphic, as previously described. As can be seen in FIGS. 6a-d, the multi-purpose tool graphic is displaying the highlight mode icon to indicate that the highlight mode is invoked. In this example embodiment, the highlight mode allows a user to highlight text. FIG. 6a shows a user tapping (or selecting) the paginated content to initiate a drag, which can be used to select text to be highlighted. In some embodiments, the tap (or selection) to initiate the drag has to be performed over a word or within the text to create a highlight. FIG. 6b shows a screen shot after the user has dragged to highlight the desired text section. FIG. 6c shows a screen shot after the user released the drag gesture to complete the highlighting. In some embodiments, dragging to highlight may highlight entire words at a time, while in other embodiments, dragging to highlight may highlight individual characters at a time. In yet another embodiment, individual characters may be highlighted until a space within the text is highlighted, causing only entire words to be highlighted after the space has been highlighted.

In this example embodiment, the highlighted text section is automatically selected after the highlighting is created to allow the highlighted section to be edited. When selected, the highlighted text section includes two handles on either end of the section, as can be seen in FIG. 6c, that can be used to expand or contract the highlighting in either direction (from the handle's original location) by dragging the handle as desired. Note that in this example embodiment, one of the handles is also a color picker tool, which can be used to change the highlighting color or to delete the highlighting (by selecting the X deletion graphic on the current highlight color in this example case), in addition to being able to expand/contract the highlighting. Also note that in some embodiments, the user may be able to use the handles to expand the highlighting across multiple pages. In some embodiments, when dragging a handle to expand/contract the highlighting, the handle being dragged, upon release, expands to become the color picker tool. As can be seen in FIG. 6d, the user can tap (or make a selection) away from the highlight to deselect the highlight, thereby causing the highlight to no longer be editable and causing the handles (including the color picker tool) to stop being presented/displayed. Note that in some embodiments, a user can re-select a highlight (e.g., to edit the highlight) by tapping on it. In some such embodiments, the highlight mode (or note mode or annotation mode) may need to be invoked before re-selecting the highlight.

FIGS. 7a-d, 8a-h, and 9a-d illustrate an example note mode of an electronic computing device, configured in accordance with one or more embodiments of the present invention. As will be apparent in light of this disclosure, the note mode may allow for the creation and editing of multiple note types including (but not limited to) sticky notes, margin notes, and/or highlight notes. In accordance with one or more embodiments, FIGS. 7a-d relate to the creation and editing of a sticky note, FIGS. 8a-h relate to the creation and editing of a margin note, and FIGS. 9a-d relate to the creation and editing of a highlight note. Remember that the note mode may also be referred to herein and in the figures as an annotation mode (since the annotation mode may include all of the functionality of the note mode, in some embodiments). The note mode can be invoked using a multi-purpose tool graphic, as previously described. As can be seen in FIGS. 7a-d, 8a-h, and 9a-d, the multi-purpose tool graphic is displaying the note mode icon to indicate that the note mode is invoked.

FIGS. 7a-d illustrate creating and editing a sticky note using an example note mode of an electronic computing device, in accordance with an embodiment of the present invention. FIG. 7a shows a user tapping (or selecting) the paginated content to create a sticky note at the location where the user tapped (or selected). FIG. 7b shows a screen shot after the sticky note has been created. As can be seen, a sticky note edit box is automatically presented, allowing the user to enter text at the cursor location using, for example, the virtual keyboard that is also presented in this example embodiment. Note that the sticky note edit box in this example embodiment includes a color picker tool that can be used to move the edit box (e.g., by dragging the color picker tool), to change the color of the sticky note (e.g., by tapping on/selecting the desired color circle), to delete the sticky note (e.g., by tapping on/selecting the X graphic on the currently selected color), or to toggle the note to a margin note using the note toggle tool (e.g., by selecting the margin note icon, as will be described in more detail below). In some embodiments, the user may be able to edit or configure the font (size, color, type, etc.), alignment (left, center, right, etc.), and or other properties of the text entered for a sticky note, margin note, and/or highlight note.

FIG. 7c shows a screen shot after the user has entered text ("Sample note") into the edit box (e.g., using the virtual keyboard). As can also be seen, the user has tapped (or selected) outside of the edit box to save the sticky note as shown in FIG. 7d. In some embodiments, a created/edited note may be saved from the edit box (for either a sticky note, margin note, or highlight note) using some other action, such as hitting a save button that is present in the note edit box in another embodiment, or some other suitable action as will be apparent in light of this disclosure. In some embodiments, tapping outside of the edit box (for either a sticky note, margin note, or highlight note) prior to entering text and/or when the edit box is empty, may cause the note to not be saved. Note that the sticky note saved in FIG. 7*d* is in the location of the initial tap to create sticky note location of FIG. 7*a*. Also note that the sticky note and associated edit box have the same color. In some embodiments, the sticky note can be further edited by tapping on (or selecting) the note to cause the associated sticky note edit box to be presented again. In some embodiments, the sticky note can be moved by press-and-holding on the sticky note (when not in edit mode) to grab it, dragging the grabbed sticky note to a desired location, and then dropping the sticky note at the desired location (e.g., as will be discussed with reference to FIG. 9*b*).

Figure 8E:
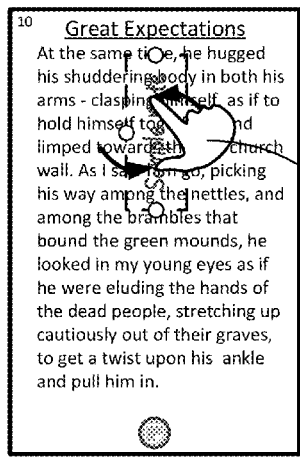

FIGS. 8*a-h* illustrate creating and editing a margin note using an example note mode of an electronic computing device, in accordance with one or more embodiments of the present invention. In this example embodiment, margin notes can be created by converting a previously created sticky note to a margin note. For ease of description, the sticky note created in FIGS. 7*a-d* will be used to illustrate creating the margin note in this example embodiment. FIG. 8*a* shows the previously created sticky note in edit mode (with the edit box presented, e.g., as shown in FIG. 7*c*). As can also be seen, the user is tapping (or selecting) the margin note icon in the note toggle tool to convert the note type from a sticky note to a margin note. FIG. 8*b* is a screen shot showing the result of the conversion. As can be seen, the contents of the sticky note have been converted to a margin note, allowing the margin note to be edited in a manner similar to how a sticky note can be edited (e.g., editing the text using the virtual keypad at the bottom of the screen). Note that the contents of the note ("Sample note") were maintained when the note was converted from a sticky note to a margin note. In this example embodiment, the margin note includes a color picker (similar to the color picker shown for the sticky note); however, a garbage can deletion icon is now present on the current color of the margin note and the garbage can icon can be selected to delete the note. A selectable X graphic is also included, which can be selected to save the note and close out from editing the contents of the margin note. FIG. 8*c* shows the user tapping (or selecting) the selectable X graphic to save all of the edits made to the margin note (e.g., the color of the note was changed as can be seen between FIGS. 8*b* and 8*c* by the change in location of the garbage can deletion icon). In some embodiments, sticky notes may have a similar color picker as the margin note shown in FIG. 8*b* (e.g., including the garbage can deletion icon on the current color of the note and selectable X graphic to save the note), while in some embodiments, margin notes may have a similar color picker as the sticky note shown in FIG. 8*a* (e.g., including an X deletion icon on the current color of the note and an edit box that a user can select outside of to save the note).

FIG. 8*d* is a screen shot showing the result of tapping the X graphic to save the margin note as shown in FIG. 8*c*. As can be seen in FIG. 8*d*, after the user tapped the X graphic to save the margin note contents, the margin note is presented over the text of the paginated digital content, inside of a bounding box having ratio handles. Note that the margin note location is the same as the sticky note location from the previously created sticky note (as shown in FIG. 7*d*), in this example case. The bounding box allows the user to rotate, resize, change the ratio of, and move the margin note, each of which will be discussed in turn. FIG. 8*e* illustrates the bounding box being rotated to rotate the margin note. As can be seen, the user used a two finger twist gesture on the bounding box to rotate the box and the margin note counterclockwise ninety degrees. In some embodiments, the bounding box may have specific rotation stop points (e.g., every forty-five or ninety degrees from horizontal), while in other embodiments, the bounding box may be able to be freely rotated to any angle. In yet other embodiments, the bounding box may have stop points when rotated in one direction (e.g., counterclockwise) and be capable of being freely rotated in the other direction (e.g., clockwise), for example. Between FIGS. 8*e* and 8*f*, the user may have used a two finger pinch-in gesture over the margin note (not shown) to resize/scale, and more specifically, shrink, the margin note. In this example embodiment, a two-fingered pinch-in gesture performed on the note can be used to shrink the margin note text/contents, and a two-fingered spread-out gesture performed on the note can be used to enlarge the note text/contents. Non touch-sensitive input may be used to perform the two-fingered gestures used to edit the margin note while in the bounding box as described herein, as will be apparent in light of this disclosure.

Figure 8F:
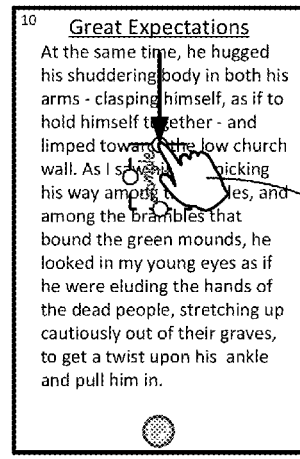

FIG. 8*f* illustrates the bounding box being resized using the ratio handles to reflow/scale the margin note to best fit within the bounding box (e.g., to avoid hyphenation, if possible). As can be seen, the top handle was dragged down to decrease the size of the box and the margin note contents adjusted accordingly. If the two-fingered pinch-in gesture was previously performed to shrink the margin note text, then the gesture in FIG. 8*f* may have only caused a reflow of the margin note text as shown. If the two-fingered pinch-in gesture was not previously performed, then the gesture in FIG. 8*f* may have caused both a reflow and a scaling (scale down, in this example case) of the margin note text as shown. In this example embodiment, any four of the ratio handles may be used to resize the bounding box. In other example embodiments, the bounding box may have fewer or additional handles to allow resizing the margin note. For example, the bounding box may have only two handles (e.g., one in each corner). In such an example, the two bounding box handles may allow for resizing and/or reflowing of the content (e.g., when one or both handles are dragged to expand or contract the box and its contents) and for rotating the box (e.g., by hovering over one of the handles to bring up a rotation wheel that can be rotated to rotate the bounding box and its contents). Numerous other configurations and margin note bounding box variations may be apparent in light of this disclosure.

Figure 8G:
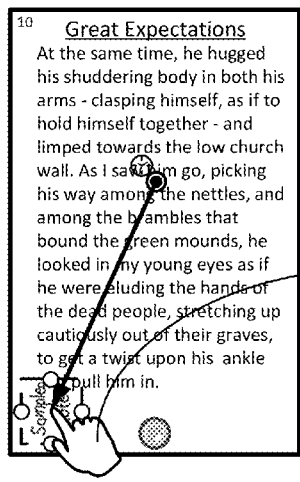
Figure 8H:
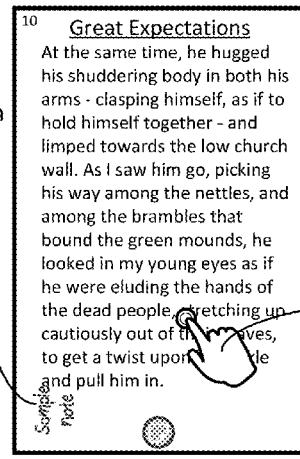

FIG. 8*g* illustrates the bounding box being moved to move the margin note. As can be seen, the user performed a press-and-hold gesture on the bounding box and then dragged the box to a desired location, and then released the box to move it to the desired location shown. In some embodiments, margin notes can be moved anywhere on the paginated digital content, including over highlighted text. FIG. 8*h* shows the user tapping (or selecting) outside of the bounding box to save the margin note and exit the bounding box editing. Note that in this example embodiment, the margin note contents are immediately visible (compared to, e.g., the sticky note, which has to be selected to view its contents). In some embodiments, the user may be able to enter bounding box editing by tapping (or selecting) once on the margin note and enter the edit box editing by tapping (or selecting) twice on the margin note (or once when the margin note is in bounding box editing). Therefore, the margin note has two levels of editing that can be accessed. Note that when the margin note is in edit box editing (e.g., as shown in FIG. 8*b*), the user can use the note toggle tool to convert a margin note to a sticky note. In some embodiments, a margin note can only be created from a sticky note.

FIGS. 9*a-d* illustrate creating and editing a highlight note using an example note mode of an electronic computing device, in accordance with an embodiment of the present invention. In this example embodiment, highlight notes can be created by combining a sticky note with a highlight. For ease of description, the sticky note created in FIGS. 7a-d and the highlight created in FIGS. 6a-d will be used to illustrate creating the highlight note in this example embodiment. FIG. 9a shows the previously created sticky note and highlight. As can be seen in FIG. 9b, the user has performed a press-and-hold to grab the sticky note and then dragged the grabbed sticky note over the highlighted text. In this example embodiment, the sticky note grows and includes a border (e.g., a translucent border) when grabbed, as shown in FIG. 9c. As can also be seen, when the grabbed highlight appears over the highlighted text, the highlight appears selected as shown. Other feedback (visual, aural, and/or tactile) may be provided to indicate that the sticky note has been grabbed, that the grabbed sticky note is hovering over the highlight and/or that dropping the sticky note will create a highlight note. For example, the highlight note as shown in FIG. 9d may start to appear to indicate a highlight note will be formed, or some other suitable feedback.

FIG. 9c is a screen shot showing the highlight note created after the sticky note was released on the highlight in this example embodiment. As can be seen, a highlight note edit box is automatically presented, allowing the user to enter text at the cursor location using, for example, the virtual keyboard that is also presented in this example embodiment. The highlight note edit box in this example embodiment allows the highlight note to be edited in a manner similar to how a sticky note can be edited (using its corresponding edit box), as previously described. However, the highlight note edit box does not include a note toggle tool, since a highlight note cannot be converted to a margin note, in this example embodiment. As can also be seen, the user in this example embodiment entered text ("Sample highlight note") into the edit box. Note that in this example embodiment, the highlight note edit box includes a tail showing the highlight that is attached to. Also note that the highlight note maintained its own color (the color from the sticky note) and did not inherit the color of the highlight it was combined with.

FIG. 9d is a screen shot showing the highlight note saved after the user has tapped (or selected) outside of the highlight note edit box to save the highlight note. As can be seen, the highlight note is located at the beginning of the highlight in this example embodiment and the highlight note color is independent of the associated highlight color. In some embodiments, the created highlight note can be changed back to a sticky note by dragging the highlight note away from its associated highlight. In some embodiments, the user may have to press-and-hold on the highlight note before being able to drag it away from a highlight to change it to a sticky note. Remember that annotations as used herein may include highlights and/or notes added to paginated digital content, and that the functionality of the highlight and note modes (as variously described herein) may be collectively included in an annotation mode. For example, in some embodiments, the annotation mode (when invoked) may be configured to allow a user a to drag over text to highlight it and tap to create sticky notes, as well as select previously created highlights and notes to edit and interact with them (e.g., to create a highlight note as described in FIGS. 9a-d).

As will be apparent in light of this disclosure, the annotations as variously described herein (e.g., highlights, sticky notes, margin notes, and highlight notes) may have an affinity to text or locations within the paginated digital content. For example, a highlight is associated with or has an affinity to the text it is associated with and sticky notes and margin notes have an affinity to the locations within the paginated content where they were created or moved to. Therefore, when the paginated digital content is modified to change, for example, the viewing preferences of the paginated content (e.g., zoom in/out, increase/decrease font size or margins, etc.), the annotations may move with the paginated content to maintain their position relative to the text (or other content) of the paginated content they were originally associated with. For example, if the eBook viewing preferences for the eBook shown in FIG. 6d were changed to make the text larger, the highlight associated with "the brambles . . . green mounds." would still be associated with that textual passage and thus become larger with the text to ensure that the text is still highlighted in the manner shown.

Merging, Deleting, Filtering, and Searching Annotations

FIGS. 10a-d and 11a-h illustrate example merge annotation functions for an annotation mode of an electronic computing device, in accordance with one or more embodiments of the present invention. More specifically, FIGS. 10a-d illustrate merging a previously created sticky note with another previously created sticky note and FIGS. 11a-h illustrate merging a previously created highlight with another previously created highlight (where each highlight has its own highlight note). FIGS. 12a-h illustrate example delete annotation and undo delete annotation functions for an annotation mode of an electronic computing device, in accordance with one or more embodiments of the present invention. Note that although the undo delete annotation function shown in FIGS. 12e-h is in the context of undoing one or more annotation deletions, the undo feature may also be used for undoing the merging of annotations, in some embodiments. The annotation mode can be invoked using a multi-purpose tool graphic, as previously described. In some embodiments, the annotation mode may be invoked upon the selection or grabbing of a previously created annotation. As can be seen in FIGS. 10a-d, 11a-h, and 12a-h, the multi-purpose tool graphic is displaying an annotation mode icon to indicate that the annotation mode is invoked. These examples are provided for illustrative purposes and are not intended to be limiting. Numerous other variations of merging and/or deleting annotations (e.g., highlights and/or notes added to paginated digital content), as well as undoing such merges and/or deletions, will be apparent in light of the present disclosure.

FIGS. 10a-d illustrate merging sticky notes added to paginated digital content, in accordance with an embodiment of the present invention. FIG. 10a shows two previously created sticky notes: sticky note 1 having color 1 and sticky note 2 having color 2. As can be seen, the user has performed a press-and-hold on sticky note 1 to grab it. In this example embodiment, the sticky note grows and includes a border (e.g., a translucent border) when grabbed, as shown. FIG. 10b shows the user dragging the grabbed sticky note 1 and dropping it on sticky note 2. In this example embodiment, when the grabbed sticky note (e.g., sticky note 1 in this example case) is hovering over the sticky note to be dropped on (e.g., sticky note 2 in this example case) the sticky note to be dropped on grows and includes a border (e.g., a translucent border), similar to the grabbed sticky note, as shown in FIG. 10b. Other feedback (visual, aural, and/or tactile) may be provided to indicate that the sticky note has been grabbed, that the grabbed sticky note is hovering over another sticky note and/or that dropping the sticky note will merge the sticky notes.

FIG. 10c is a screen shot showing the merged sticky note edit box after sticky note 1 was released on sticky note 2 in this example embodiment. As can be seen, the merged sticky note inherited the color of sticky note 2 (color 2). As can also be seen, the contents of sticky note 1 have been added to the end of the contents of sticky note 2. In some embodiments, a blank line or other suitable separator, may be entered between the contents of the merged notes. After tapping outside of the merged sticky note edit box, as shown in FIG. 10c, the merged sticky note can be saved in the location shown in FIG. 10d. As can be seen, the location of sticky note 2 (and the color, as previously described) were inherited in this example embodiment. In other embodiments, the sticky note that was dragged and dropped (e.g., sticky note 1, in the previous example case) may dictate the color, location, and/or initial content of the merged note.

Although sticky notes are being merged together in the merging example shown in FIGS. 10a-d and described above, sticky notes can also be merged with highlight notes in a similar manner. However, one difference from the merging example shown in FIGS. 10a-d may be that, in some embodiments, when merging a sticky note with a highlight note, the grabbed sticky note can be dragged and dropped onto any portion of a highlight already containing a highlight note to combine the grabbed sticky with the highlight note. Note (as previously described) that once a highlight note is grabbed (e.g., using a press-and-hold input) and dragged away from its associated highlight, it may become a sticky note. Therefore, if a user wants to grab a highlight note and drag it away from its associated highlight to merge it with a sticky note or another highlight note, such actions can be tantamount to merging a sticky note with the sticky note or other highlight note.

Figures 11E, 11F:
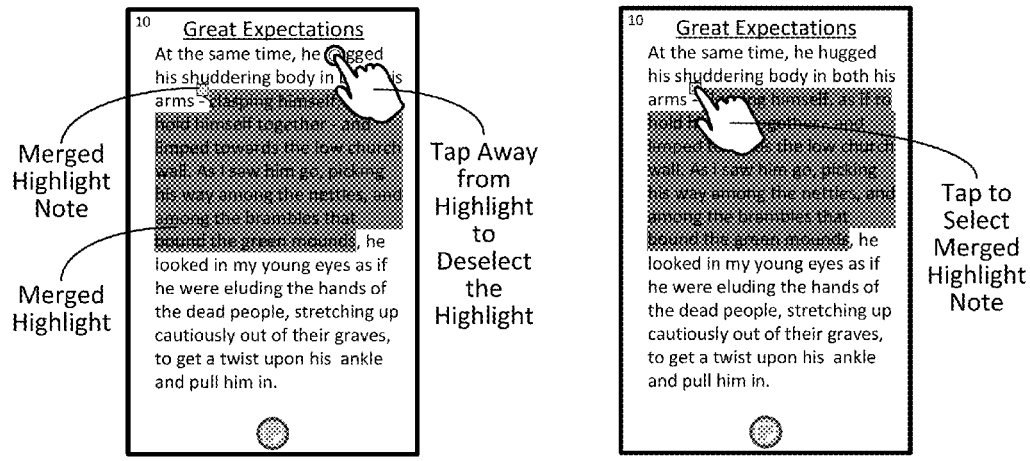

FIGS. 11a-h illustrate merging highlights including highlight notes added to paginated digital content, in accordance with an embodiment of the present invention. FIG. 11a shows two previously created highlights (each including associated highlight notes): highlight 1 having color 1 (and an associated highlight note 1 having color 2) and highlight 2 having color 3 (and an associated highlight note 2 having color 4). FIG. 11b is a screen shot showing highlight 2 selected in response to a user tapping on (or selecting) highlight 2. Note that the handles, including the color picker tool appear to indicate that highlight 2 is selected. FIG. 11c illustrates a user dragging the top handle of highlight 2 to drag highlight 2 to highlight 1, such that highlight 2 temporarily overlaps highlight 1 as shown. Note in this example embodiment that the overlap need not be a complete overlap, but it could be (e.g., where a highlight is totally encompassed by the highlight being dragged/expanded). In some embodiments, only a character may have to overlap when dragging to merge highlights. Also note that highlight note 2 follows along with highlight 2 in this example embodiment while it is being dragged using the handle as shown in FIG. 11c. In some embodiments, feedback may be provided to indicate that highlight 2 has been temporarily dragged to (and overlaps with) highlight 1. Such feedback may include visual, aural, and/or tactile feedback to indicate, for example, that dropping the dragged handle of highlight 2 would cause highlight 1 and highlight 2 to merge.

FIG. 11d is a screen shot showing the merged highlights (including the merged highlight notes) after the user released the dragged highlight 2 at the point shown in FIG. 11c to merge the highlights together. As can be seen, the merged highlight inherited the color of highlight 2 (color 3) and the merged highlight extends to the beginning of highlight 1. As can also be seen, the merged highlight note inherited the color of highlight note 2 (color 4) and is located at the beginning of the merged highlight. Therefore, the color of the dragged highlight and highlight note were inherited in this example embodiment. In other embodiments, the highlight dragged to (e.g., highlight 1, in the previous example case) may dictate the color of the resulting merged highlight. Also, in other embodiments, the highlight note of a highlight dragged to (e.g., highlight note 1, in the previous example case) may dictate the color of the resulting merged highlight note and/or dictate the order of the content in the merged highlight note. In some embodiments, where only one of the highlights being merged has an associated highlight note, the merged highlight note essentially remains the same (except that will be located in front of the merged highlight).

Figures 11G, 11H:
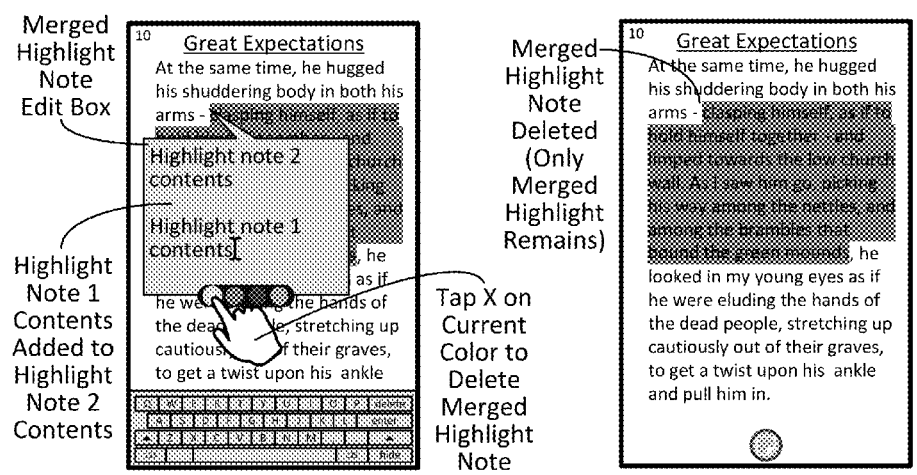

In this example embodiment, and as shown in FIG. 11d, the merged highlight is selected after the highlight merging has been performed. FIG. 11e shows the user tapping (or selecting) away from the highlight to deselect the highlight. FIG. 11f shows the user tapping (or selecting) the merged highlight note to select it and cause the merged highlight note edit box shown in FIG. 11g to appear. Note that in some embodiments, when merging highlights where at least one of the merged highlights has an associated highlight note, the annotation mode may be configured to present/display the merged highlight note edit box. For example, in such a configuration, the merged highlight note edit box shown in FIG. 11g would have presented itself in FIG. 11d, when the user released dragging highlight 2 to merge highlight 2 and highlight 1. FIG. 11g shows that the contents of highlight note 1 have been added to the end of the contents of highlight note 2. In some embodiments, a blank line or other suitable separator, may be entered between the contents of the merged notes. FIG. 11g also shows a user tapping (or selecting) the X graphic on the current color of the merged highlight note to delete the merged highlight note. FIG. 11h shows the merged highlight after the merged highlight note has been deleted.

In some cases, a highlight may be expanded by dragging one of its handles, and during such an expansion, the highlight may overlap or encompass one or more highlights. In such cases, the highlight being dragged/modified, in some embodiments, may dictate the color of the final merged highlight. In such cases, if the highlight being dragged/modified encompasses other highlights having highlight notes, the color and content of the resulting merged highlight note associated with the resulting merged highlight may be dictated based on one of two scenarios. In a first scenario, where the highlight being dragged has a highlight note, the color of the resulting merged highlight note will be, in an example embodiment, the color of the dragged highlight note, and the content of the merged highlight note will be dictated by the order in which the highlight notes were overlapped (with the content of the highlight note of the highlight being dragged being on top). In a second scenario, where the highlight being dragged does not have a highlight note, the color of the resulting merged highlight note will be, in an example embodiment, the color of the first highlight note overlapped, and its content will be dictated by the order in which the highlight notes were overlapped. In some cases a highlight may be expanded by dragging one of its handles, and during such an expansion, the highlight may overlap or encompass one or more sticky notes. In such cases, the scenarios laid out for overlapping/encompassing highlight notes may also apply to overlapping/encompassing sticky notes, in accordance with some embodiments. The techniques illustrated in FIGS. 11a-h and described herein can also be used to merge a previously created highlight with a new highlight being created. For example, if you tap and drag to create a new highlight having a blue color and continue the drag over an existing highlight that is yellow, the existing highlight can be merged into the new highlight when the drag is released, resulting in a merged highlight that is blue.

FIGS. 12a-d illustrate deleting annotations added to paginated digital content, in accordance with one or more embodiments of the present invention. FIG. 12a shows a previously created sticky note and previously highlighted text. As can be seen, a user has performed a press-and-hold on the sticky note to grab it. In this example embodiment, the grabbed sticky note grows and includes a border (e.g., a translucent border) when grabbed, as shown in FIG. 12a. FIG. 12b shows the user flicking the grabbed sticky note to delete it. In some embodiments, the sticky note may animate off the screen when it is flicked to delete it. FIG. 12b shows, in this example embodiment, the sticky note fading off the screen in the direction it has been flicked. Other feedback (visual, aural, and/or tactile) may be provided to indicate that a sticky note has been grabbed or to indicate that a sticky note is being deleted or has been deleted. In this example embodiment, the flick input to delete the sticky note may be in any direction after grabbing the sticky note. In some embodiments, the press-and-hold (to grab) then flick to delete input as variously described herein may be used to delete margin notes and/or highlight notes.

FIG. 12c shows that the user has performed a press-and-hold on the sticky note to grab it. In this example embodiment, the highlight collapses into an upside down teardrop (with instructions inside stating "Flick to delete") when grabbed, as shown in FIG. 12c. In some embodiments, the annotation mode may be configured to not collapse grabbed highlights or to collapse a grabbed highlight into another suitable representation, such as a circle, a ball, a teardrop shape, or a crumpled up piece of paper, for example. FIG. 12d shows the user flicking the grabbed (and collapsed) highlight to delete it. In some embodiments, the grabbed highlight may animate off the screen when it is flicked to delete it. FIG. 12d shows, in this example embodiment, the grabbed highlight (which collapsed into an upside down teardrop in this example case) fading off the screen in the direction it has been flicked. Other feedback (visual, aural, and/or tactile) may be provided to indicate that a highlight has been grabbed or to indicate that a highlight is being deleted or has been deleted. In this example embodiment, the flick input to delete the highlight may be in any direction after grabbing the highlight. In some embodiments, a highlight note associated with a highlight being deleted using a press-and-hold (to grab) then flick input may be deleted as well. In other embodiments, the highlight note associated with the highlight being deleted may detach from the highlight and change to a sticky note after the highlight is deleted.

In some embodiments, annotations may be deleted using other suitable techniques or based on other suitable deletion input. For example, and as previously described, annotations (highlights and/or notes) may be deleted by selecting an X or garbage can deletion graphic associated with the annotation. Such a selectable deletion graphic may be presented when editing the annotation. For example, the X or garbage can deletion graphic may be located on a color picker tool presented when editing a highlight or note (e.g., as shown in FIG. 6c for a highlight, FIG. 7c for a sticky note, FIG. 8c for a margin note, and FIG. 9c for a highlight note). A user can tap on or select the X or garbage can deletion graphic when presented to delete the annotation (e.g., as shown in FIGS. 11g-h). Various other suitable deletion input will be apparent in light of this disclosure.

FIGS. 12e-h illustrate undoing the annotation deletions performed in FIGS. 12a-d, in accordance with one or more embodiments of the present invention. FIG. 12e shows a user shaking (or providing shake input to) the electronic computing device to undo the last deletion performed. As can be seen in FIG. 12f, after the deletion was undone in response to the shake input, the deleted highlight returned to the text from the paginated digital content it was associated with prior to deletion (e.g., compare FIG. 12a to FIG. 12f). In some embodiments, an animation may be provided to indicate that the deletion has been undone. For example, if a user performs a press-and-hold then flick input to flick the annotation off the screen in the direction of the flick and thereby delete the annotation (e.g., as shown in FIGS. 12a-b and in FIGS. 12c-d), undoing the deletion may cause the annotation to animate back to its location on the paginated digital content in a direction opposite the way it was flicked off the screen. In another example, if a user selects a deletion graphic (e.g., an X or garbage can) associated with an annotation to delete it (e.g., as shown in FIGS. 11g-h), undoing the deletion may cause the annotation to animate back to its location on the paginated digital content by fading in on that location. FIG. 12g shows a user performing a Z-shaped gesture to undo the last deletion performed. In this example case, since the deletion of the highlight was undone, the last deletion performed prior to that deletion, was the deletion of the sticky note as shown in FIG. 12b. As can be seen in FIG. 12h, after the deletion was undone in response to the Z-shaped gesture input, the deleted sticky note returned to the paginated digital content at the spot it was located prior to deletion (e.g., compare FIG. 12a to FIG. 12h).

In some embodiments, merging annotations (as variously described herein) may be undone in a similar manner to undoing annotation deletions. Undoing the merging of two (or more) annotations, in some embodiments, may cause merged annotations to return to their previous state prior to merging in response to an undo input. Therefore, in some embodiments, the annotations mode may be configured to undo the most recent annotation deletion and/or merge in response to an undo input. Note that the shake and Z-shaped gesture undo input shown in FIGS. 12e and 12g are provided as examples for illustrative purposes and are not intended to limit the present disclosure. Various other suitable undo input may be used to undo one or more annotation deletions and/or merges. For example, in some embodiments, undo input may include a Ctrl+Z command (using a keyboard), selecting an undo button from a dialog (which may pop up in response to deleting or merging an annotation), or some other suitable input as will be apparent in light of this disclosure.

Figure 13A:
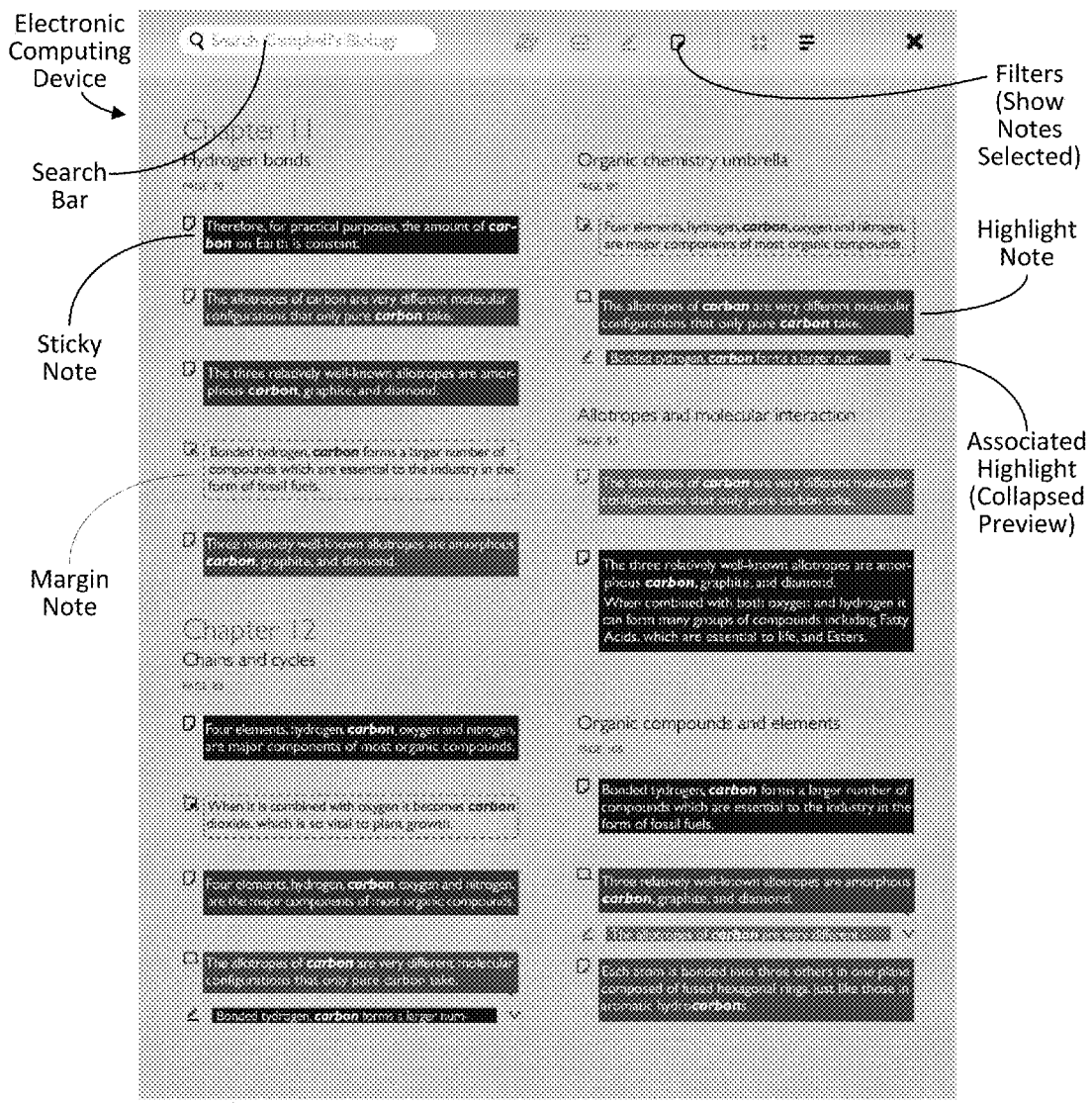
Figure 13B:
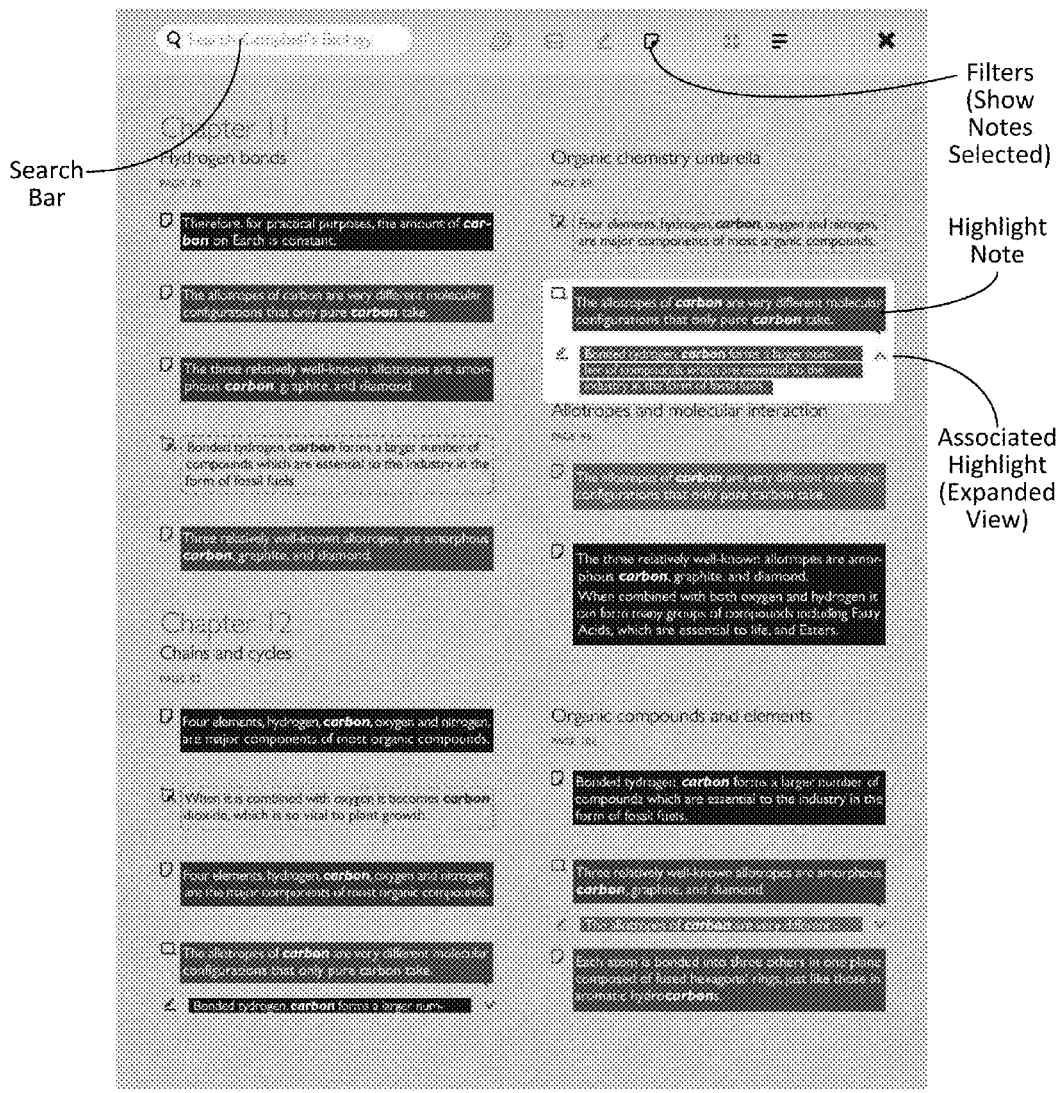
Figure 13C:
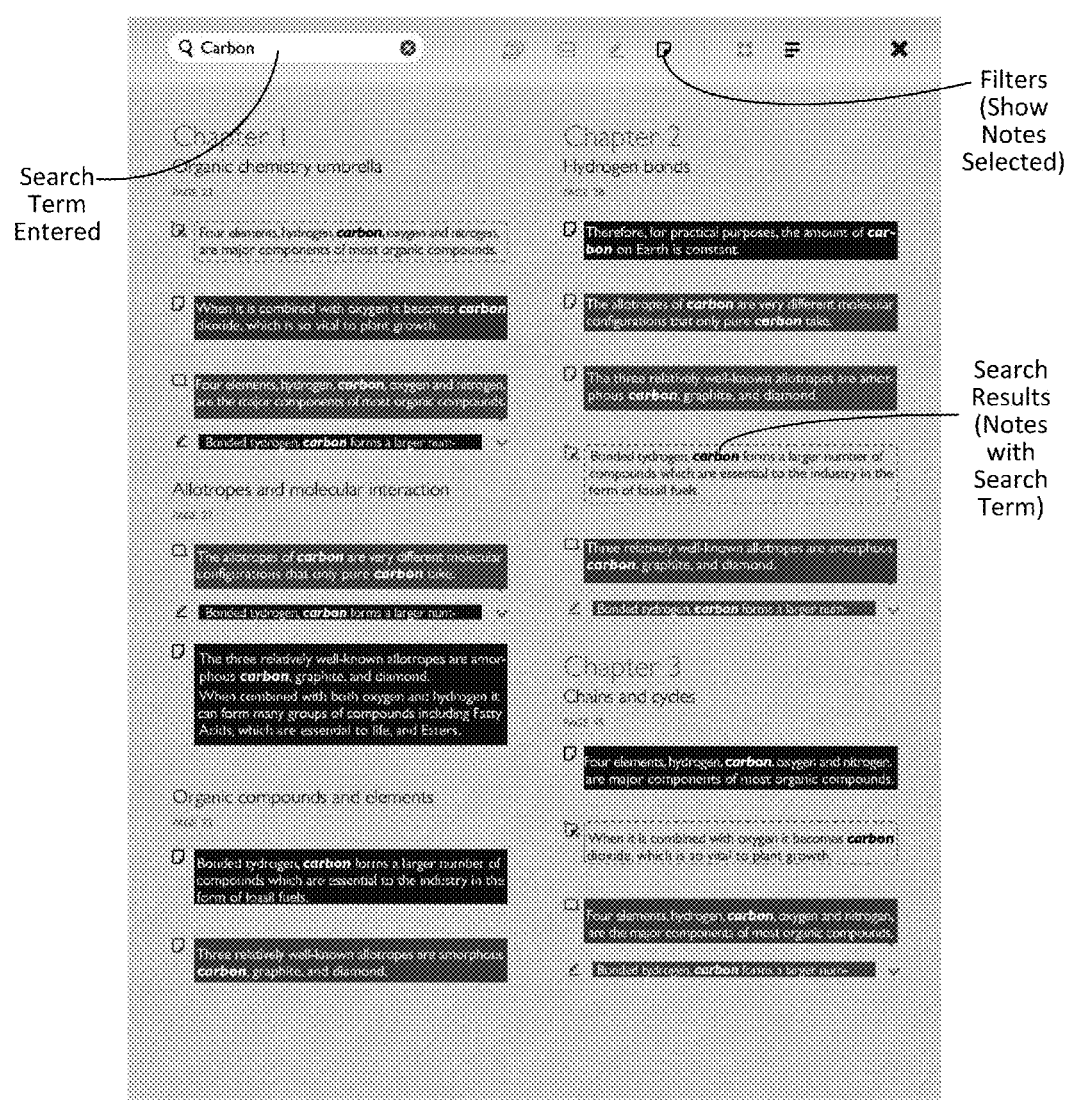

FIGS. 13a-c illustrate example filtering and searching functions for an annotation mode of an electronic computing device, in accordance with one or more embodiments of the present invention. The screen shots in FIGS. 13a-c each include a search bar at the top left of the screen and a filter selection section at the top middle of the screen. FIG. 13a is a screen shot showing only notes for paginated digital content, as indicated the show notes filter selection. As can be seen, the resulting display includes sticky notes, margin notes, and highlight notes. The highlight notes also include the associated highlights below each note, initially in a collapsed preview view, to, for example, provide context for the highlight note. FIG. 13b is a screen shot showing the expanded view of a highlight associated with a highlight note, as can be seen in the white section on the right side of the screen. The expanded view was displayed in this example embodiment as a result of selecting the down arrow next to the collapsed preview of the associated highlight (causing the arrow to point upward when the view is expanded). FIG. 13c is a screen shot showing the filtered search results when searching for the term "carbon." As can be seen, only notes including the "carbon" term are displayed, with the search term in bold in each note found containing the term (e.g., to identify where in the notes the term appears).

As will be apparent in light of this disclosure, in some embodiments, the filtering and searching functionality previously described may be used with highlights to, for example, filter them out and only view highlighted passages, or to search them and only find search results from within the highlighted content. In the screen shots shown in FIGS. 13a-c, the highlights filter icon is located to the left of the notes filter icon. In some embodiments, the filtering and searching functionality previously described may be used with all annotations, including notes and highlights. In such embodiments, a user may be able to view all annotations at once (e.g., in the list view shown in FIGS. 13a-c) or search for a term or phrase within all annotations. In some embodiments, the filtering/searching functionality may allow a user to filter out and/or search specific note types (e.g., sticky notes, margin notes, and/or highlight notes). In some embodiments, the filtering/searching functionality may allow a user to filter out and/or search all annotations (e.g., highlighted content, notes, and/or bookmarks or flags) of a certain color. Numerous variations and configurations will be apparent in light of this disclosure.

Methodology

Figure 14:
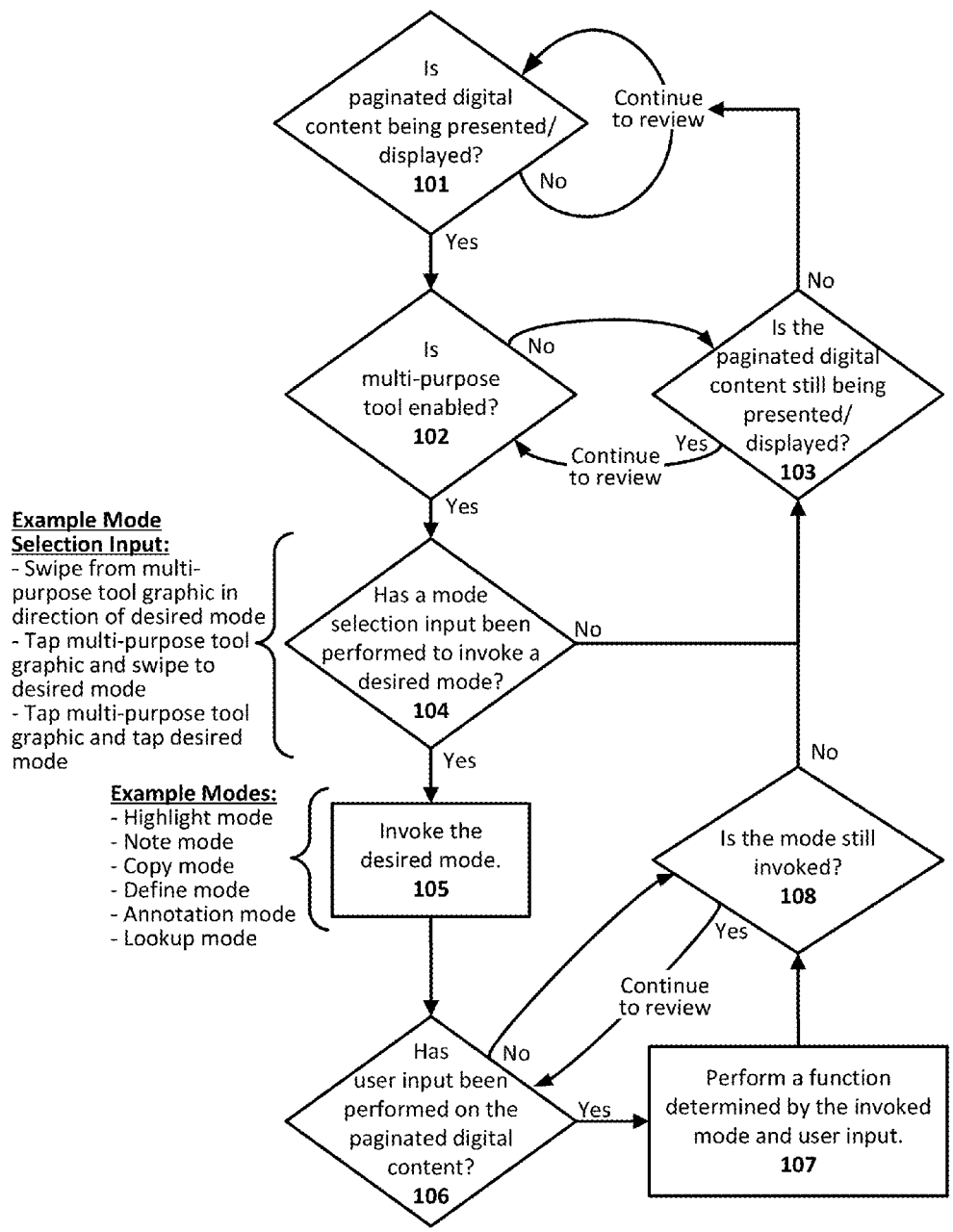
FIG. 14 illustrates a method for providing a multi-purpose tool in an electronic computing device, in accordance with one or more embodiments of the present invention.
Figure 15:
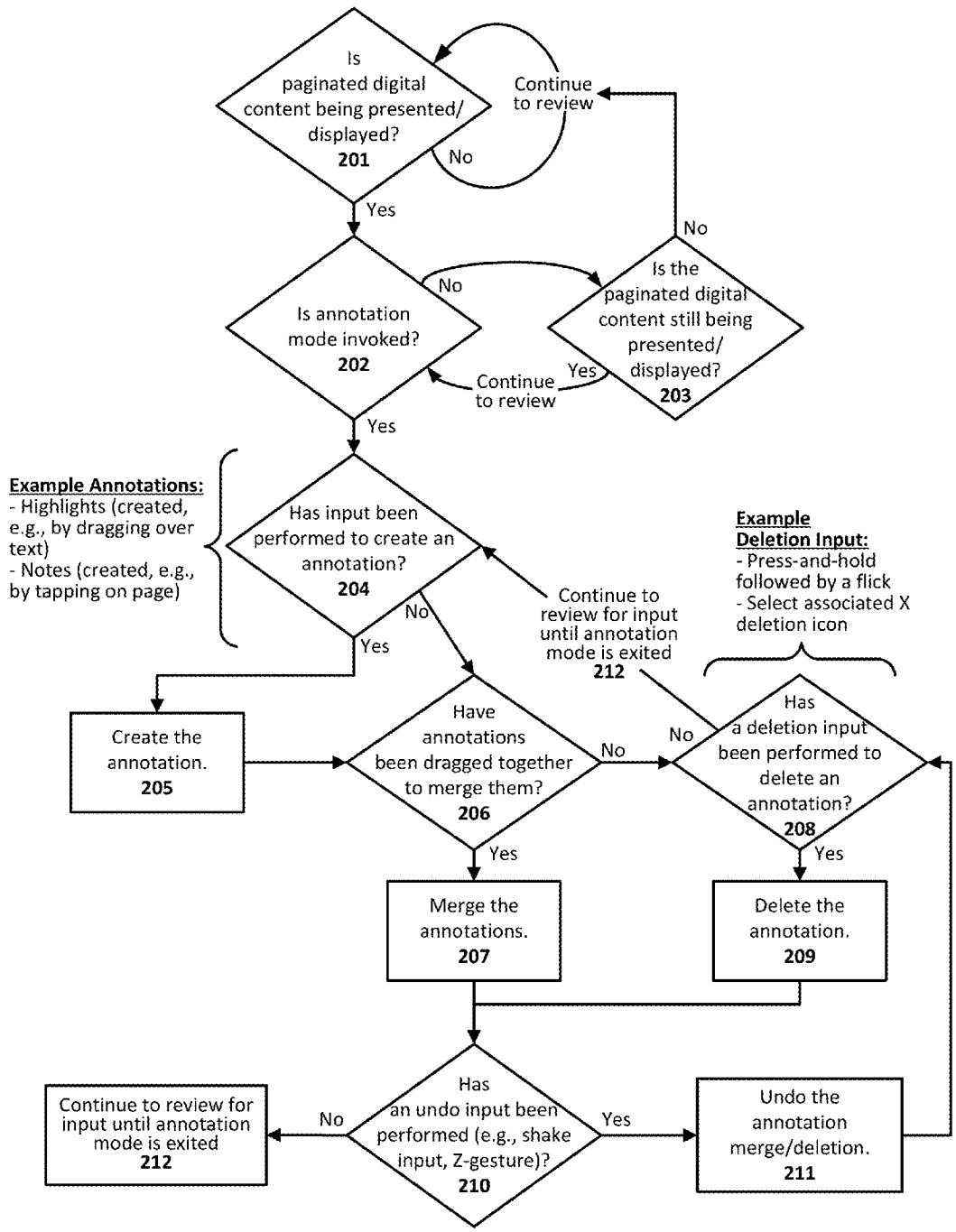
FIG. 15 illustrates a method for providing an annotation mode in an electronic computing device, in accordance with one or more embodiments of the present invention.

FIG. 14 illustrates a method for providing a multi-purpose tool in an electronic computing device, in accordance with one or more embodiments of the present invention. FIG. 15 illustrates a method for providing an annotation mode in an electronic computing device, in accordance with one or more embodiments of the present invention. The example methodologies may be implemented, for instance, by the UI module of the example electronic computing device shown in FIG. 2a, or the example electronic computing device shown in FIG. 2b (e.g., with the UI provisioned to the client by the server). To this end, the UI may be implemented in software, hardware, firmware, or any suitable combination thereof, as will be appreciated in light of this disclosure. In computing devices including a touch screen or other touch-sensitive interface, the computing device may be able to detect contact, whether direct or proximate (e.g., via hovering input), which can be used in various ways to implement UI functionality, including performing a mode selection input using the multi-purpose tool, a deletion input to delete an annotation (e.g., a highlight and/or a note), or other input as variously described herein.

In the example case illustrated in FIG. 14 the method starts by determining 101 if paginated digital content (or similarly divided digital content) is being presented/displayed. The paginated digital content may be presented/displayed using any appropriate application or program, such as an eReader application, an office application (e.g., document viewing application), a magazine/catalog reader application, or any other suitable application or program. If paginated digital content is not being displayed (or otherwise presented), the method continues to review until such content is displayed. Once paginated digital content is being displayed, the method continues by determining 102 if a multi-purpose tool (as variously described herein) is enabled. In some embodiments, the multi-purpose tool may be enabled from a configuration/settings menu or it may be enabled when a specific application or program is running, for example. In some embodiments, the multi-purpose tool may be tied to one or more applications capable of presenting/displaying paginated digital content and the tool may not be available/enabled until one such application is running, active, and/or displayed (which may result in a conservation of device power and/or memory).

If the multi-purpose tool is not enabled, then the method continues by reviewing 103 if the paginated digital content is still being displayed. If the content is not still being displayed, the method continues back at diamond 101 to review if paginated digital content is being displayed. If the paginated digital content is still being displayed, the method continues to review until either the multi-purpose tool is enabled (e.g., enabled from the application presenting/displaying the paginated digital content) or until the paginated digital content is no longer being displayed. Remember, paginated digital content as used herein includes content that is divided in an organized manner. For example, a gallery application configured to present/display discrete photographs may be considered paginated digital content and may benefit from the multi-purpose tool as variously described herein.

Once the multi-purpose tool has been enabled, the method continues by determining 104 if a mode selection input has been performed to invoke a desired mode. Mode selection input may include swiping from the multi-purpose tool in the direction of a desired mode, tapping/press-and-holding the multi-purpose tool and then swiping to the desired mode while maintaining contact, tapping the multi-purpose tool (e.g., to expand the tool to show the available modes) and then tapping the desired mode, or any other suitable input as will be apparent in light of this disclosure. FIGS. 3e-m show example mode selection input, in accordance with some embodiments. Continuing from diamond 104 of FIG. 14, if a mode selection input has not been performed, the method continues by reviewing 103 if the paginated digital content is still being displayed (and also, in some cases, if 102 the multi-purpose tool is still enabled). If a mode selection input has been performed to invoke a desired more, the method continues by invoking 105 the desired mode. Example modes may include an annotation mode, highlight mode, note mode, copy mode, define mode, or lookup mode, all of which are variously described herein, or some other suitable mode as will be apparent in light of this disclosure.

After the desired mode is invoked, the method continues by determining 106 if user input has been performed on the paginated digital content. User input may include dragging over text of the paginated content (e.g., to create a highlight) or tapping/selecting the paginated content (e.g., to create a sticky note), as previously described. If user input has not been performed, the method continues by determining 108 if the mode is still invoked. If user input has been performed, the method continues by performing 107 a function determined by the invoked mode and user input. For example if the user input is dragging over text of the paginated content, the function performed would depend on the invoked mode. In such an example, if a highlight or annotation mode (as variously described herein) is the invoked mode, then the function performed may be to highlight the text that was dragged over. However, if the invoked mode is a copy mode (as variously described herein), then the function performed may be to copy the text that was dragged over (or to select the text and request copy confirmation, for example).

After the function determined by the invoked mode and user input is performed 107, the method continues by determining 108 if the mode is still invoked. If the mode is still invoked, the method continues to review if 106 user input has been performed on the paginated digital content until either such user input has been performed/received or until the mode is no longer invoked. In some embodiments, the mode may be turned off or no longer be invoked if another mode is selected/invoked, if the multi-purpose tool is disabled, if the paginated digital content is closed, and/or if a home or power button is selected, just to list a few possible examples. If the mode is not still invoked, the method continues to diamond 103 to determine if the paginated digital content is still being presented/displayed. Alternatively, the method may continue to diamond 102 (to determine if the multi-purpose tool is still enabled) or to diamond 104 (to determine if a mode selection input has been performed to invoke a desired mode).

In the example case illustrated in FIG. 15 the method starts by determining 201 if paginated digital content (or similarly divided digital content) is being presented/displayed. As previously described, the paginated digital content may be presented/displayed using any appropriate application or program, such as an eReader application, an office application (e.g., document viewing application), a magazine/catalog reader application, or any other suitable application or program. If paginated digital content is not being displayed (or otherwise presented), the method continues to review until such content is displayed. Once paginated digital content is being displayed, the method continues by determining 202 if an annotation mode (as variously described herein) is invoked. As previously described, in some embodiments, the functionality of the annotation mode may be included in two separate modes, such as a highlight mode and a note mode. In some embodiments, the annotation mode may be invoked (and/or enabled) from a configuration/settings menu or it may be invoked when a specific application or program is running, for example. In some embodiments, the annotation mode may be tied to one or more applications capable of presenting/displaying paginated digital content and the mode may not be available/enabled/invoked until one such application is running, active, and/or displayed (which may result in a conservation of device power and/or memory).

If the annotation mode is not invoked, then the method continues by reviewing 203 if the paginated digital content is still being displayed. If the content is not still being displayed, the method continues back at diamond 201 to review if paginated digital content is being displayed. If the paginated digital content is still being displayed, the method continues to review until either the annotation mode is invoked (e.g., invoked from the application presenting/displaying the paginated digital content) or until the paginated digital content is no longer being displayed. Once the annotation mode has been invoked, the method continues by determining 204 if an input has been performed/provided to create an annotation. Note that in some embodiments, the currently presented/displayed page may be locked when the annotation mode is invoked. Annotations may include highlights (as variously described herein), which may be created by dragging over the text (e.g., as shown in FIGS. 6*a-d*), and notes (as variously described herein), such as sticky notes, which may be created by tapping on or selecting the currently presented/displayed page (e.g., as shown in FIGS. 7*a-d*). If input has been performed to create an annotation, the method continues by creating 205 the annotation.

If input has not been performed to create an annotation, the method continues by determining 206 if annotations have been dragged together to merge them. Such a determination may include, in some embodiments, preliminarily determining if more than one annotation is present/displayed on the current page. In other embodiments, annotations may be able to be dragged across pages to merge them, such that a preliminary determination may be made to determine if more than one annotation has been created in the entirety of the paginated digital content. If annotations have been dragged together to merge them, then the method continues by merging 207 the annotations. For example, FIGS. 10*a-d* show an example of a sticky note being merged with another sticky note and FIGS. 11*a-d* show an example of a highlight (including a highlight note) being merged with another highlight (including its own associated highlight note). Note that in some embodiments, performing an input to initiate merging annotations (e.g., a press-and-hold input on a sticky note) may invoke the annotation mode (or highlight mode or note mode), for example.

Continuing from diamond 206 of FIG. 15, if annotations have not been dragged together to merge them, then the method can continue by determining 208 if a deletion input has been performed/provided to delete an annotation. Such a determination may include, in some embodiments, preliminarily determining if an annotation is present/displayed on the current page. If a deletion input has been performed to delete an annotation, the method continued by deleting 209 the annotations. Example deletion input includes a press-and-hold on an annotation to grab it followed by a flick of the grabbed annotation (e.g., as shown in FIGS. 12*a-e*) and/or a selection of an associated X or garbage can deletion graphic (e.g., as shown in FIGS. 11*g-h*). If annotations have been merged 207 or an annotation has been deleted 209, the annotation mode may be configured to determine 210 if an undo input has been performed to undo the merge or deletion function. The undo input may include a shake input (e.g., shaking the computing device), a Z-gesture input, a Ctrl+Z command, or selecting an undo button from a dialog (which may pop up in response to merging or deleting annotations), just to name a few examples. If an undo input has been performed after a merge or delete function has been performed, the method continues by undoing 211 the annotation merge/deletion. In some embodiments, the annotation mode may be configured to allow undoing any number of merges/deletions as long as no intervening non-merge/delete actions (e.g., create an annotation) have been performed.

If a deletion input has not been performed, the method continues to review for an input (e.g., create annotation input or merge annotations input) until the annotation mode is exited, turned off, or no longer invoked. In some embodiments, once the annotation mode is invoked, the order of reviewing for annotation creation input, merging input, or deletion input may be varied (e.g., review for such input may happen concurrently). In some embodiments, the annotation mode may also be exited, turned off, or no longer be invoked if another mode is selected/invoked, if the paginated digital content is closed, and/or if a home or power button is selected, just to list a few possible examples.

Numerous variations and embodiments will be apparent in light of this disclosure. One example embodiment of the present invention provides an electronic device comprising a display for presenting paginated digital content to a user, and a user interface including an annotation mode. The annotation mode includes multiple note types for paginated digital content, the note types comprising: i) a sticky note that can be created in response to a tap or mouse click or selection made on the paginated digital content when the annotation mode is invoked, wherein the sticky note is represented by a movable graphic and selection of the graphic causes contents of the sticky note to be presented; and ii) a margin note that can be created by converting a previously created sticky note to a margin note, wherein contents of the margin note are always presented and the margin note is configured to be placed anywhere on the paginated digital content. In some cases, the note types further comprise: iii) a highlight note that can be created by dragging and dropping a previously created sticky note on highlighting previously added to text of the paginated digital content, wherein the highlight note becomes associated with the highlighting. In some such cases, a highlight note inherits the color of the sticky note used to create the highlight note. In some cases where the note types further comprise a highlight note, highlight notes and margin notes can be converted back to sticky notes. In some cases, the contents of a sticky note are presented in an edit box, the edit box allowing the contents of the sticky note to be edited. In some cases, the edit box also includes a color picker tool, the color picker tool allowing the sticky note color to be selected. In some cases where the contents of a sticky note are presented in an edit box, the edit box also includes a note toggle tool, the note toggle tool allowing the sticky note to be converted to a margin note. In some cases, the presented contents of a margin note can be edited in a bounding box, the bounding box allowing the contents of the margin note to be rotated, resized, reflowed, and/or moved. In some cases, the annotation mode is further configured to allow notes to be searched. In some cases, the annotation mode is further configured to filter out notes from the paginated digital content such that the notes are presented in a filtered out view. In some such cases, highlight notes presented in the filtered out view include the highlighted text each highlight note is associated with. In some cases, the annotation mode can be invoked through a graphic presented on the paginated digital content. In some such cases, when invoking the annotation mode using the graphic presented on the paginated digital content, a desired color for sticky notes to be created can be simultaneously selected.

Another example embodiment of the present invention provides a mobile computing device comprising a processor, a touch screen display for displaying paginated digital content to a user and allowing user input, and a user interface executable by the processor and including an annotation mode. The annotation mode includes multiple note types that can be added to paginated digital content when the annotation mode is invoked, the note types comprising: i) a sticky note that can be created in response to a tap or mouse click or selection made on the paginated digital content when the annotation mode is invoked, wherein the sticky note is represented by a movable graphic and selection of the graphic causes contents of the sticky note to be presented; ii) a margin note that can be created by converting a previously created sticky note to a margin note, wherein contents of the margin note are always presented and the margin note is configured to be placed anywhere on the paginated digital content; and iii) a highlight note that can be created by dragging and dropping a previously created sticky note on highlighting previously added to text of the paginated digital content, wherein the highlight note becomes associated with the highlighting. In some cases, the contents of all of the note types are editable from an edit box presented in response to tapping on or selecting a note at least once. In some such cases, a virtual keyboard is simultaneously presented with the edit box, the virtual keyboard allowing a user to input text in the edit box to modify the contents of the note.

Another example embodiment of the present invention provides a computer program product comprising a plurality of instructions non-transiently encoded thereon that when executed by one or more processors cause a process to be carried out. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to, in response to a tap or mouse click or selection made on paginated digital content when an annotation mode is invoked, create a sticky note that includes content and is represented by a movable graphic. The process is also configure to, in response to input, convert the sticky note to a margin note, wherein contents of the margin note are always presented and the margin note is configured to be placed anywhere on the paginated digital content. In some cases, the process is further configured to, in response to dragging and dropping a previously created sticky note graphic on highlighting previously added to text of the paginated digital content, convert the sticky note to a highlight note, wherein the highlight note is associated with the highlighting it was dropped on. In some such cases, a highlight note inherits the color of the sticky note converted to create the highlight note, while in some such cases, highlight notes and margin notes can be converted back to sticky notes.

The foregoing description of the embodiments of the present disclosure have been presented for the purposes of illustration and description. It is not intended to be exhaustive or to limit the disclosure to the precise forms disclosed. Many modifications and variations are possible in light of this disclosure. It is intended that the scope of the present invention be limited not by this detailed description, but rather by the claims appended hereto.

What is claimed is:

1. An electronic device, comprising:
a display for presenting paginated digital content to a user; and
a user interface including an annotation mode, the annotation mode including multiple different note types for paginated digital content, the note types comprising:
   i) a sticky note that can be created in response to a tap or mouse click or selection made on the paginated digital content when the annotation mode is invoked, wherein the sticky note is represented by a movable graphic and selection of the graphic causes contents of the sticky note to be presented; and
   ii) a margin note that can be created by converting a previously created sticky note to a margin note, such that the margin note replaces the previously created sticky note and includes content from the previously created sticky note, wherein contents of the margin note are always presented and the margin note is configured to be placed anywhere on the paginated digital content.

2. The device of claim 1, the note types further comprising:
iii) a highlight note that can be created by dragging and dropping a previously created sticky note on highlighting previously added to text of the paginated digital content, wherein the highlight note becomes associated with the highlighting.

3. The device of claim 2 wherein a highlight note inherits the color of the sticky note used to create the highlight note.

4. The device of claim 2 wherein highlight notes and margin notes can be converted back to sticky notes.

5. The device of claim 1 wherein the contents of a sticky note are presented in an edit box, the edit box allowing the contents of the sticky note to be edited.

6. The device of claim 5 wherein the edit box also includes a color picker tool, the color picker tool allowing the sticky note color to be selected.

7. The device of claim 5 wherein the edit box also includes a note toggle tool, the note toggle tool allowing the sticky note to be converted to a margin note.

8. The device of claim 1 wherein the presented contents of a margin note can be edited in a bounding box, the bounding box allowing the contents of the margin note to be rotated, resized, reflowed, and/or moved.

9. The device of claim 1 wherein the annotation mode is further configured to allow notes to be searched.

10. The device of claim 1 wherein the annotation mode is further configured to filter out notes from the paginated digital content such that the notes are presented in a filtered out view.

11. The device of claim 2 wherein a highlight note created from a previously created sticky note replaces the previously created sticky note and includes content from the previously created sticky note.

12. The device of claim 1 wherein the annotation mode can be invoked through a graphic presented on the paginated digital content.

13. The device of claim 12 wherein when invoking the annotation mode using the graphic presented on the paginated digital content, a desired color for sticky notes to be created can be simultaneously selected.

14. A mobile computing device, comprising:
   a processor;
   a touch screen display for displaying paginated digital content to a user and allowing user input; and
   a user interface executable by the processor and including an annotation mode, the annotation mode including multiple different note types that can be added to paginated digital content when the annotation mode is invoked, the note types comprising:
   i) a sticky note that can be created in response to a tap or mouse click or selection made on the paginated digital content when the annotation mode is invoked, wherein the sticky note is represented by a movable graphic and selection of the graphic causes contents of the sticky note to be presented;
   ii) a margin note that can be created by converting a previously created sticky note to a margin note, such that the margin note replaces the previously created sticky note and includes content from the previously created sticky note, wherein contents of the margin note are always presented and the margin note is configured to be placed anywhere on the paginated digital content; and
   iii) a highlight note that can be created by dragging and dropping a previously created sticky note on highlighting previously added to text of the paginated digital content, wherein the highlight note becomes associated with the highlighting.

15. The device of claim 14 wherein the contents of all of the note types are editable from an edit box presented in response to tapping on or selecting a note at least once.

16. The device of claim 15 wherein a virtual keyboard is simultaneously presented with the edit box, the virtual keyboard allowing a user to input text in the edit box to modify the contents of the note.

17. A computer program product comprising a plurality of instructions non-transiently encoded thereon that when executed by one or more processors cause the following process to be carried out:
   in response to a tap or mouse click or selection made on paginated digital content when an annotation mode is invoked, create a sticky note that includes content and is represented by a movable graphic; and
   in response to input, convert the sticky note to a margin note, such that the margin note replaces the converted sticky note and includes content from the converted sticky note, wherein contents of the margin note are always presented and the margin note is configured to be placed anywhere on the paginated digital content.

18. The computer program product of claim 17, the process further comprising:
   in response to dragging and dropping a previously created sticky note graphic on highlighting previously added to text of the paginated digital content, convert the sticky note to a highlight note, wherein the highlight note is associated with the highlighting it was dropped on.

19. The computer program product of claim 18 wherein a highlight note inherits the color of the sticky note converted to create the highlight note.

20. The computer program product of claim 18 wherein highlight notes and margin notes can be converted back to sticky notes.

* * * * *